(12) United States Patent
Tavangar et al.

(10) Patent No.: US 11,782,271 B2
(45) Date of Patent: Oct. 10, 2023

(54) AUGMENTED REALITY DEVICE AND METHODS OF USE

(71) Applicant: Brilliant Labs Limited, Central Hong Kong (HK)

(72) Inventors: Bobak Tavangar, Washington, DC (US); Rajesh Nakarja, Stockholm (SE)

(73) Assignee: Brilliant Labs Limited, Central Hong Kong (HK)

( * ) Notice: Subject to any disclaimer, the term of this patent is extended or adjusted under 35 U.S.C. 154(b) by 0 days.

(21) Appl. No.: 18/138,257

(22) Filed: Apr. 24, 2023

(65) Prior Publication Data

US 2023/0266586 A1 Aug. 24, 2023

Related U.S. Application Data

(63) Continuation-in-part of application No. 18/127,319, filed on Mar. 28, 2023, which is a continuation of
(Continued)

(51) Int. Cl.
*G02B 27/01* (2006.01)
*G02B 27/18* (2006.01)
(Continued)

(52) U.S. Cl.
CPC ........... *G02B 27/0101* (2013.01); *G02B 5/04* (2013.01); *G02B 27/0172* (2013.01);
(Continued)

(58) Field of Classification Search
CPC .............. H01L 27/322; H01L 27/3246; H01L 51/5284; H04N 5/2257; G06F 3/0412;
(Continued)

(56) References Cited

U.S. PATENT DOCUMENTS 6,057,966 A * 5/2000 Carroll ............... G02B 27/0172
359/630
6,421,031 B1 * 7/2002 Ronzani ............... G02B 27/017
359/630

(Continued)

*Primary Examiner* — Ryan A Lubit
(74) *Attorney, Agent, or Firm* — Cognition IP, P.C.; Edward Steakley

(57) ABSTRACT

Computer-implemented methods of operating an augmented reality device can involve capturing camera images, processing the camera images, and displaying virtual display images. The camera images can be captured automatically using a camera disposed within an augmented reality device worn by a user. The camera images can be processed automatically using a processor located within the augmented reality device. The virtual display images can be displayed automatically to the user within the augmented reality device while the user is looking through the augmented reality device and simultaneously viewing real objects through the augmented reality device. The virtual display images can be based on the processed camera images. Additional steps can include accepting a first user input, storing camera image(s) on a memory located within the augmented reality device based on the first input, accepting a second user input, and displaying stored image(s) to the user based on the second input.

30 Claims, 22 Drawing Sheets

Related U.S. Application Data application No. 17/881,160, filed on Aug. 4, 2022, now Pat. No. 11,640,056, which is a continuation of application No. 17/687,576, filed on Mar. 4, 2022, now Pat. No. 11,448,879.

(60) Provisional application No. 63/298,206, filed on Jan. 10, 2022, provisional application No. 63/297,689, filed on Jan. 7, 2022.

(51) Int. Cl.
 *G02B 5/04* (2006.01)
 *G06T 19/00* (2011.01)

(52) U.S. Cl.
 CPC ......... *G02B 27/0176* (2013.01); *G02B 27/18* (2013.01); *G06T 19/006* (2013.01); *G02B 2027/014* (2013.01); *G02B 2027/0138* (2013.01); *G02B 2027/0178* (2013.01)

(58) Field of Classification Search
 CPC ................ G06F 3/0443; G06F 3/0446; G06F 2203/04111; G06F 2203/04112
 See application file for complete search history.

(56) References Cited

U.S. PATENT DOCUMENTS

| | | | |
|---|---|---|---|
| 6,523,629 B1* | 2/2003 | Buttz | B60D 1/28 901/1 |
| 2013/0009853 A1* | 1/2013 | Hesselink | G02B 27/017 345/8 |
| 2015/0379963 A1* | 12/2015 | Holmanu | G06F 3/1454 345/173 |
| 2017/0185738 A1* | 6/2017 | Moharir | H04N 5/77 |
| 2018/0081429 A1* | 3/2018 | Akenine-Moller | G06T 3/0093 |
| 2021/0225391 A1* | 7/2021 | Wexler | H04R 1/342 |

* cited by examiner

AUGMENTED REALITY DEVICE AND METHODS OF USE

CROSS-REFERENCE TO RELATED APPLICATIONS

This application is a continuation-in-part of and claims priority to co-pending and commonly owned U.S. patent application Ser. No. 18/127,319 filed on Mar. 28, 2023, which is a continuation application of U.S. application Ser. No. 17/881,160 filed on Aug. 4, 2022, issued as U.S. Pat. No. 11,640,056, entitled "AUGMENTED REALITY DEVICE AND METHODS OF USE", which is a continuation of U.S. patent application Ser. No. 17/687,576 filed on Mar. 4, 2022, issued as U.S. Pat. No. 11,448,879, entitled "AUGMENTED REALITY DEVICE AND METHODS OF USE," which application is hereby incorporated by reference in its entirety. This application also claims the benefit of U.S. Provisional Patent Application Nos. 63/297,689 filed on Jan. 7, 2022, and 63/298,206 filed on Jan. 10, 2022, both entitled "AUGMENTED REALITY DEVICE AND METHODS OF USE," and both applications of which are hereby incorporated by reference in their entireties.

TECHNICAL FIELD

The present disclosure relates generally to electronic devices, and more particularly to wearable augmented reality devices.

BACKGROUND

Virtual reality systems and devices have become increasingly popular in recent years. Various video game arrangements, movie presentation systems, and other devices and systems can allow a user to view and sometimes even interact with a virtual reality world. For example, some sophisticated gaming systems allow a user to wear a headset that provides an entirely virtual environment to see and interact with.

Unfortunately, many virtual reality devices and systems can be unsafe when users are so immersed in a virtual world that they are unaware of their real life surroundings. Because many existing virtual reality devices and systems do not provide an ability to see what real things are there, users have been known to injure themselves or others when they are unable to perceive their real life environments. For those devices and systems that do allow some perception of an actual real life environment, there is typically little to no integration between real life items and virtual reality items. Furthermore, existing devices and systems often have no ability to adjust virtual reality displays and presentations based on the real life environment of a user.

Although traditional ways of providing a virtual or augmented reality for a user have worked well in the past, improvements are always helpful. In particular, what is desired are augmented reality devices and systems that integrate virtual displays and presentations with real life surroundings in a robust and safe manner, and that allow for customized adjustments to the virtual displays and presentations based on the environment of the user.

SUMMARY

It is an advantage of the present disclosure to provide augmented reality devices and methods for using them that integrate virtual displays and presentations with real life surroundings in a robust and safe manner, and that allow for customized adjustments to the virtual displays and presentations based on the environment of the user. The disclosed features, apparatuses, systems, and methods provide improved augmented reality solutions that involve virtual displays that enhance the experience of a user without impairing the ability of the user to perceive and act within their real life environment. These advantages can be accomplished in multiple ways, such as by providing an augmented reality device and system that readily couples to existing eyewear of a user, that provides virtual displays to the user in unique ways, and that records real life events around the user for customized playbacks on the virtual displays.

In various embodiments of the present disclosure, an augmented reality device can include an outer housing, an attachment component, a camera, and a display arrangement. The outer housing can have a front and a back that define parallel planes, are transparent, and are arranged to allow a user to see therethrough. The attachment component can be coupled to the outer housing and can be configured to removably attach the augmented reality device to eyewear of the user. The camera can be disposed within the outer housing and can be configured to capture images through the outer housing front. The display arrangement can be disposed within the outer housing and can be configured to provide a virtual display to the user while the user is looking through the augmented reality device.

In various detailed embodiments, the display arrangement can provide the virtual display to the user when the user looks through the augmented reality device at a viewing angle that is not perpendicular to the outer housing front and back planes. The viewing angle can be downward from the perpendicular through the outer housing front and back planes. The display arrangement can include an image emitting component, a prism component, a projecting optic component, and a combining optic component. In some arrangements, the augmented reality device can include multiple light paths. A first light path can include a virtual image path for the virtual image display within the augmented reality device and a second light path can include a real object path for real images viewable through the augmented reality device. Also, the attachment component can include a clip configured to removably clip the augmented reality device to the front of eyeglasses worn by the user.

In further detailed embodiments, the augmented reality device can also include at least one processor disposed within the outer housing and coupled to the camera and the display arrangement. The at least one processor can be configured to receive camera images from the camera and provide the camera images to the display arrangement as at least a portion of the virtual display images. The at least one processor can also be configured to control one or more camera operations selected from the group consisting of: monitoring user surroundings, taking images, object detection, depth detection, zoom, and first and third person shooting. The augmented reality device can also include at least one memory device disposed within the outer housing and coupled to the at least one processor, and the at least one memory device can be configured to store images captured by the camera. The at least one processor can also be configured to store one or more buffer clips to the at least one memory device of recent events captured by the camera and to replay the one or more buffer clips. The augmented reality device can also include a wireless communication component disposed about the outer housing and coupled to the at least one processor, and the wireless communication component can be configured to facilitate communications with devices separate from the augmented reality device. In some arrangements, the display arrangement can include a unibody optics enclosure, which can include an image emitting component, a unibody top prism, a unibody bottom prism, a combining optic component, and a projecting optic component. The unibody top prism can be bonded to the unibody bottom prism. At least one processor can be disposed within the unibody top prism and coupled to the camera and the display arrangement, and this at least one processor can be configured to receive camera images from the camera and provide the camera images to the display arrangement as at least a portion of the virtual display images. At least one memory device disposed within the unibody top prism and coupled to the at least one processor can be configured to store images captured by the camera.

In various further embodiments of the present disclosure, computer-implemented methods of operating an augmented reality device are provided. Pertinent process steps can include capturing camera images automatically using a camera disposed within an augmented reality device worn by a user, processing the camera images automatically using a processor located within the augmented reality device, and displaying virtual display images automatically to the user within the augmented reality device while the user is looking through the augmented reality device and simultaneously viewing real objects through the virtual reality device. The virtual display images can be based on the processed camera images.

In detailed embodiments, the displaying step can include emitting the virtual display images from an image emitting component located within the augmented reality device, passing the virtual display images through a prism component located within the augmented reality device, and projecting the virtual display images through a projecting optic component located within the augmented reality device. Additional process steps can include accepting a first input from the user, storing one or more of the camera images on a memory located within the augmented reality device based on the first input, accepting a second input from the user, and displaying one or more of the stored images to the user based on the second input.

In still further embodiments of the present disclosure, an augmented reality system can include one or more non-transitory computer-readable media storing computer-executable instructions that, when executed on one or more processors, cause the one or more processors to perform operations on an associated augmented reality device. The operations can include at least capturing camera images automatically using a camera disposed within an augmented reality device worn by a user, processing the camera images automatically using a processor located within the augmented reality device, and displaying virtual display images automatically to the user within the augmented reality device while the user is looking through the augmented reality device and simultaneously viewing real objects through the virtual reality device. The virtual display images can be based on the processed camera images.

In detailed embodiments, the augmented reality system can also include the augmented reality device. Such an augmented reality device can include an outer housing, an attachment component, a camera, and a display arrangement. The outer housing can have a front and a back that define parallel planes, are transparent, and are arranged to allow the user to see therethrough. The attachment component can be coupled to the outer housing and can be configured to removably attach the augmented reality device to eyewear of the user. The camera can be disposed within the outer housing and can be configured to capture images through the outer housing front. The display arrangement can be disposed within the outer housing and can be configured to provide a virtual display to the user while the user is looking through the augmented reality device. In some arrangements, the augmented reality system can further include a charging case configured to store and charge the augmented reality device. The charging case can include a rechargeable battery, a communications port, and a charging case memory configured to store images communicated from the augmented reality device.

Other apparatuses, methods, features, and advantages of the disclosure will be or will become apparent to one with skill in the art upon examination of the following figures and detailed description. It is intended that all such additional apparatuses, methods, features and advantages be included within this description, be within the scope of the disclosure, and be protected by the accompanying claims.

In further embodiments, the augmented reality device captures a first plurality of camera images using a camera disposed within an augmented reality device worn by a user. The augmented reality device includes an outer housing having a front and a back that are transparent and arranged to allow the user to see therethrough. An attachment component is coupled to the outer housing and configured to render the augmented reality device as wearable by the user. The camera is disposed within the outer housing. A display arrangement is disposed within the outer housing and configured to provide a virtual display to the user while the user is looking through the augmented reality device.

The augmented reality device is configured to process a first plurality of camera images using a processor located within the augmented reality device. The augmented device is further configured to receive a first audio signal from a microphone of the augmented reality device. The augmented reality device may process the first audio signal using the processor located within the augmented reality device.

In some embodiments, the augmented reality device generates an electronic package including the processed camera images and/or the processed audio signal. The augmented reality device transmits the generated package for input to a machine learning model. The augmented reality device receives an output or response at least partially generated by the machine learning model.

BRIEF DESCRIPTION OF THE DRAWINGS

The included drawings are for illustrative purposes and serve only to provide examples of possible structures and arrangements for the disclosed apparatuses, systems and methods of use regarding augmented reality devices. These drawings in no way limit any changes in form and detail that may be made to the disclosure by one skilled in the art without departing from the spirit and scope of the disclosure.

DETAILED DESCRIPTION

Figure 1:
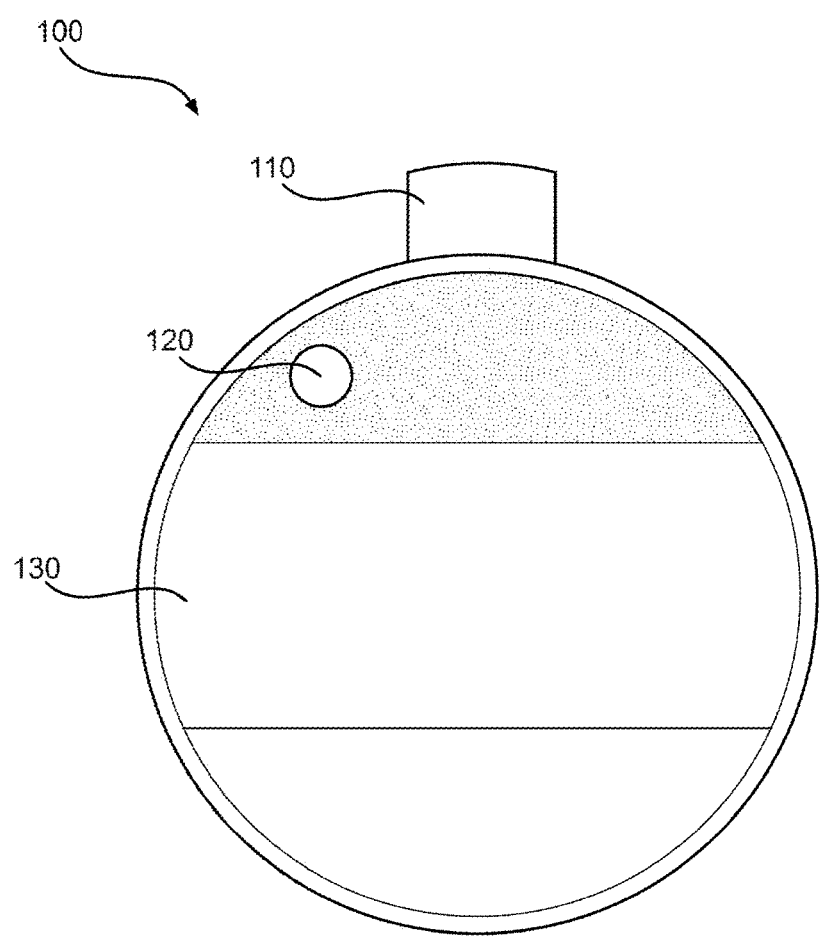
FIG. 1 illustrates in front elevation view an example augmented reality device according to one embodiment of the present disclosure.

Exemplary applications of apparatuses, systems, and methods according to the present disclosure are described in this section. These examples are being provided solely to add context and aid in the understanding of the disclosure. It will thus be apparent to one skilled in the art that the present disclosure may be practiced without some or all of these specific details provided herein. In some instances, well known process steps have not been described in detail in order to avoid unnecessarily obscuring the present disclosure. Other applications are possible, such that the following examples should not be taken as limiting. In the following detailed description, references are made to the accompanying drawings, which form a part of the description and in which are shown, by way of illustration, specific embodiments of the present disclosure. Although these embodiments are described in sufficient detail to enable one skilled in the art to practice the disclosure, it is understood that these examples are not limiting, such that other embodiments may be used, and changes may be made without departing from the spirit and scope of the disclosure.

The present disclosure relates in various embodiments to features, apparatuses, systems, and methods for augmented reality devices. The disclosed embodiments can include augmented reality devices and methods for using them that integrate virtual displays and presentations with real life surroundings in a robust and safe manner, and that allow for customized adjustments to the virtual displays and presentations based on the environment of the user. In particular, the disclosed embodiments can utilize an augmented reality device that is wearable by a user and that preferably can be readily coupled to eyewear of the user.

Such an augmented reality device can be called a "monocle," which can be a relatively small wearable device having a near-eye optical engine equipped with a camera and a display that are configured to capture visual data, process that data on the device, and display the resulting processed data as images and videos optically in front of the eye of the user while simultaneously transferring that data wirelessly off device.

In various detailed examples, which are merely illustrative and non-limiting in nature, the disclosed monocle can use one or more cameras and processors to monitor user surroundings, take images, and detect objects and depth information, as well as to provide zoom, pan, and tilt functionalities, language translation, health monitoring, and first and third person shooting, among other possible functions. Various detailed features can include storage of time stamped video on a circular buffer for display of a retroactive moment in time, high value zoom using an on-board camera to digitally capture a user perspective at a much higher resolution than the human eye, digital enhancement and optical display of captured images to the user using the digital display, a personal flashlight using on-device flash LEDs to project light out for a hands-free light word on face, and/or touch strip access around edges of the device for on-device control of user interface, among other possible features.

Although various embodiments disclosed herein discuss the provided augmented reality device as a monocle, it will be readily appreciated that the disclosed features, apparatuses, systems, and methods can similarly be used for any relevant device or system having multiple devices or views. For example, two monocles may be used in a given arrangement, with both monocles coupling to eyewear of a user to provide cameras and virtual images for each eye of the user. Other applications, arrangements, and extrapolations beyond the illustrated embodiments are also contemplated. It will be understood that reference herein to a monocle can also refer to such other devices and systems using other augmented reality device arrangements.

Referring first to FIG. 1, an example augmented reality device according to one embodiment of the present disclosure is illustrated in front elevation view. Augmented reality device (i.e., "monocle") 100 can generally include a clip 110 or other coupling component, a camera 120, and an outer housing 130. Clip 110 can be used to couple monocle 100 to eyewear or another item worn by a user. Camera 120 can capture images of that which is being seen by the user. Outer housing 130 can be at least partially transparent, such that the user is able to look therethrough to see real life environments.

Figure 2A:
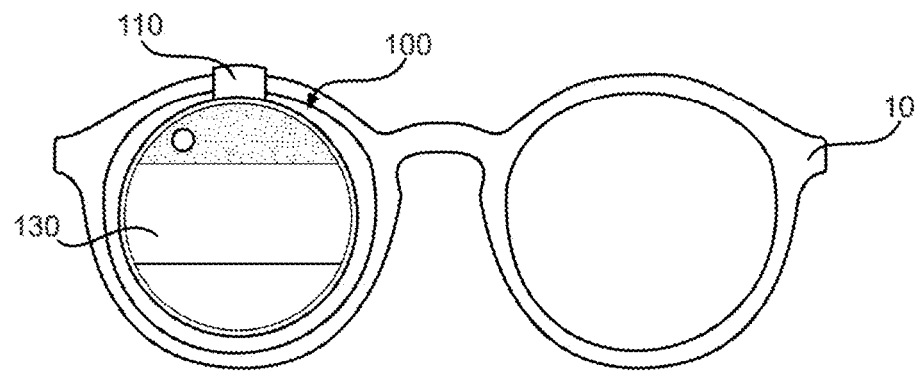
FIG. 2A illustrates in front elevation view the augmented reality device of FIG. 1 coupled to user eyewear according to one embodiment of the present disclosure.
Figure 2B:
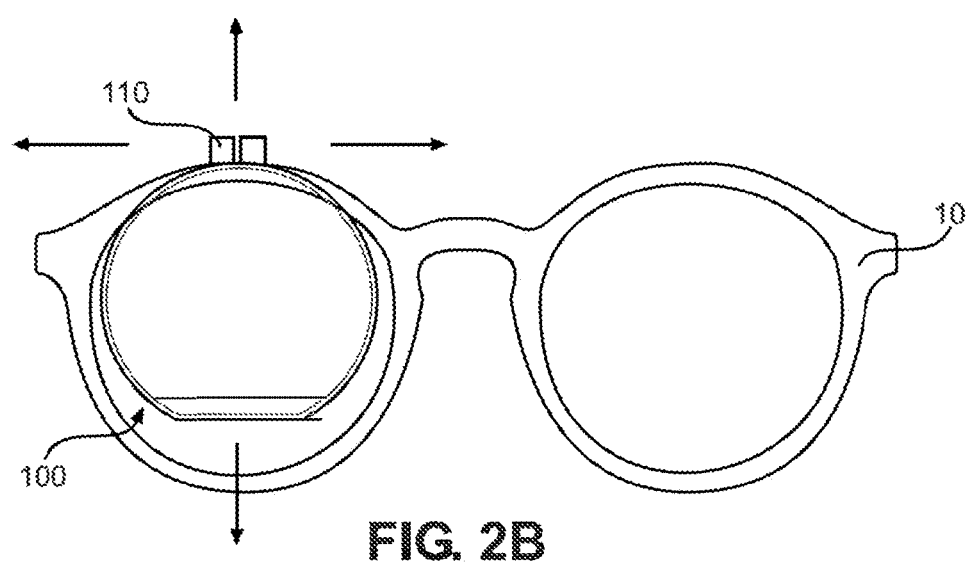
FIG. 2B illustrates in front elevation view possible positioning of the augmented reality device of FIG. 1 relative to user eyewear according to one embodiment of the present disclosure.

Continuing with FIG. 2A, the augmented reality device of FIG. 1 is shown in front elevation view as being coupled to user eyewear. As shown, monocle 100 can be clipped over the front user eyewear 10 by way of clip 110, such that the user can look through the eyewear (which is presumably transparent) and also the through monocle by way of transparent outer housing 130. FIG. 2B illustrates in front elevation view possible positioning of an augmented reality device relative to user eyewear. Again, clip 110 can be used to couple monocle 100 to user eyewear 10. As a part of monocle 100, clip 110 can allow the entire monocle to be positioned from side to side or up and down with respect to user eyewear 10 by simply sliding the entire monocle in the directions desired. In some arrangements, clip 110 can be over molded with a soft touch material, such as a thermoplastic elastomer, for example, which can securely couple monocle 100 to user eyewear 10 while preventing or limiting damage to the user eyewear.

Figure 3A:
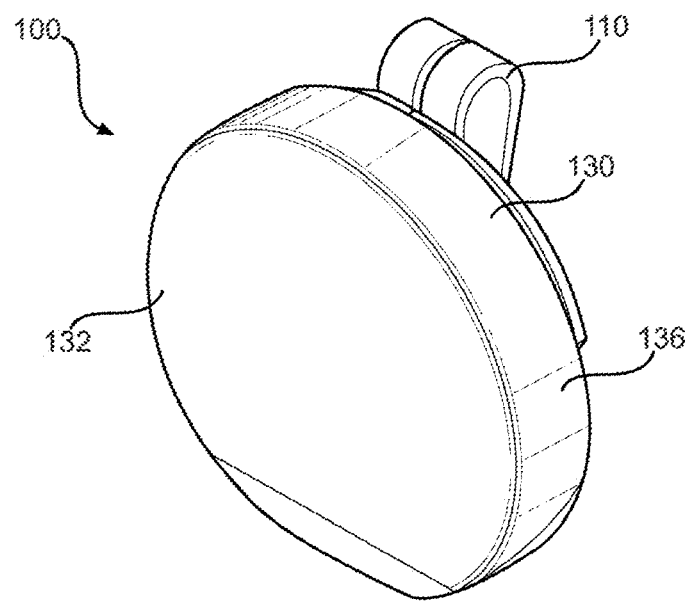
FIG. 3A illustrates in front perspective view an example augmented reality device according to one embodiment of the present disclosure.
Figure 3B:
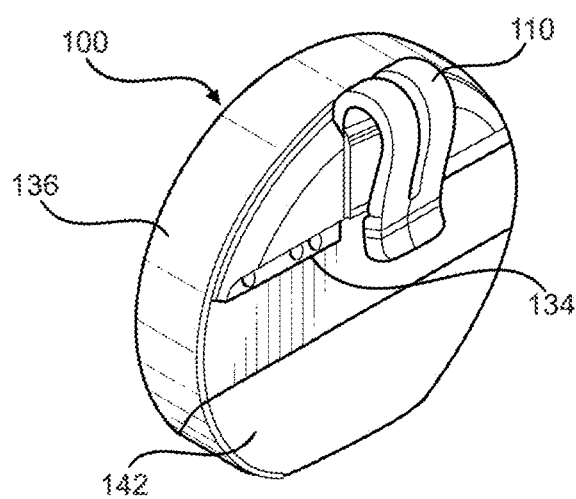
FIG. 3B illustrates in rear perspective view the augmented reality device of FIG. 3A according to one embodiment of the present disclosure.
Figure 3C:
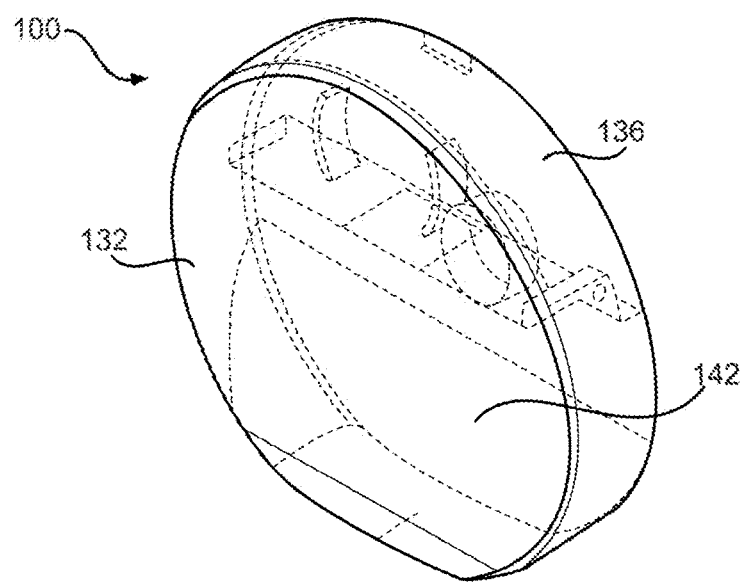
FIG. 3C illustrates in front perspective view the augmented reality device of FIG. 3A showing internal components according to one embodiment of the present disclosure.
Figure 3D:
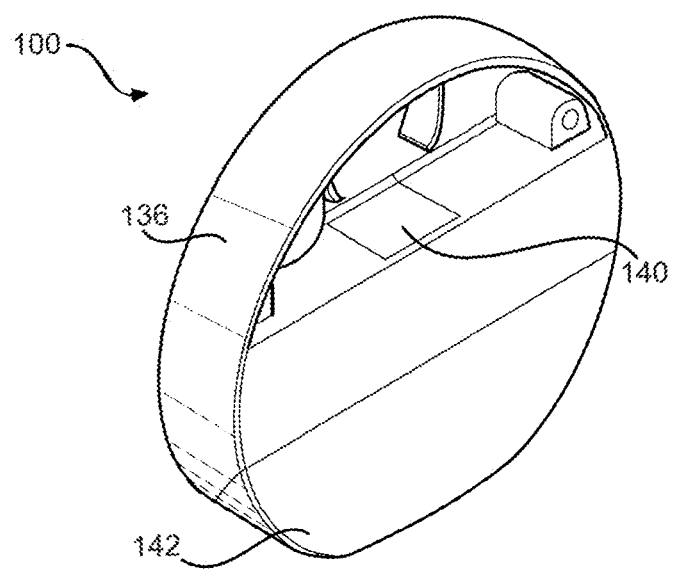
FIG. 3D illustrates in rear perspective view the augmented reality device of FIG. 3A with the back outer housing removed according to one embodiment of the present disclosure.
Figure 3E:
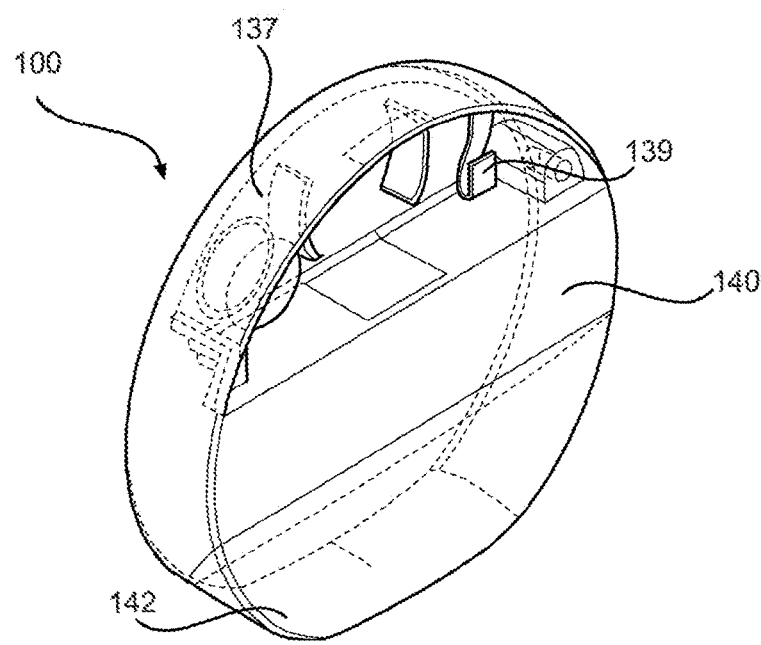
FIG. 3E illustrates in rear perspective view the augmented reality device of FIG. 3A with the back outer housing removed and showing internal components according to one embodiment of the present disclosure.
Figure 3F:
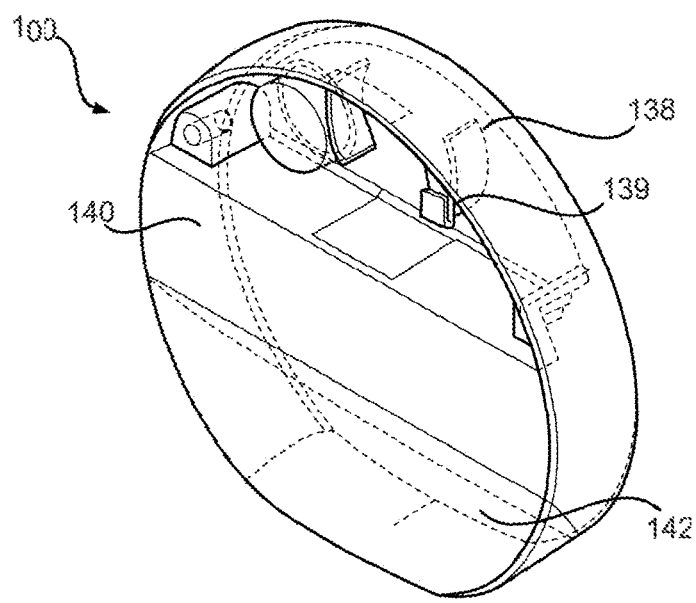
FIG. 3F illustrates in reverse rear perspective view the augmented reality device of FIG. 3A with the back outer housing removed and showing internal components according to one embodiment of the present disclosure.

Turning next to FIGS. 3A through 3F, an example augmented reality device (i.e. monocle) 100 is shown in various views. FIGS. 3A and 3B depict monocle 100 in front perspective and rear perspective views respectively. FIG. 3C shows monocle 100 in front perspective view showing internal components, while FIG. 3D depicts the monocle in rear perspective view with the back outer housing removed. FIGS. 3E and 3F illustrate monocle 100 with the back outer housing removed and showing internal components in rear perspective and reverse rear perspective views respectively. As shown in these various views, monocle 100 can generally include several major components, which can include a unibody top prism 140, a unibody bottom prism, 142, an outer housing 130, and a clip 110.

Outer housing 130 can include at least an outer housing front 132, an outer housing back 134, and an outer housing side and top 136, among other possible outer housing components. Outer housing front 132 and outer housing back 134 can define parallel planes, can be transparent or translucent, and can be arranged to allow a user to see therethrough, as will be readily appreciated. Outer housing 130 can also include a left side touch surface 137 on the left side of the monocle and a right side touch surface 138 on the right side of the monocle. Touch surfaces 137, 138 can be configured to accept user inputs, such as by a user touching or pressing on the touch surfaces. Alternatively, a button or other pushed component could be used in place of such touch surfaces 137, 138. One or more touch sensor flex cables 139 can be configured to communicate user inputs from one or both touch surfaces 137, 138 to an onboard processor within monocle 100.

Figure 4A:
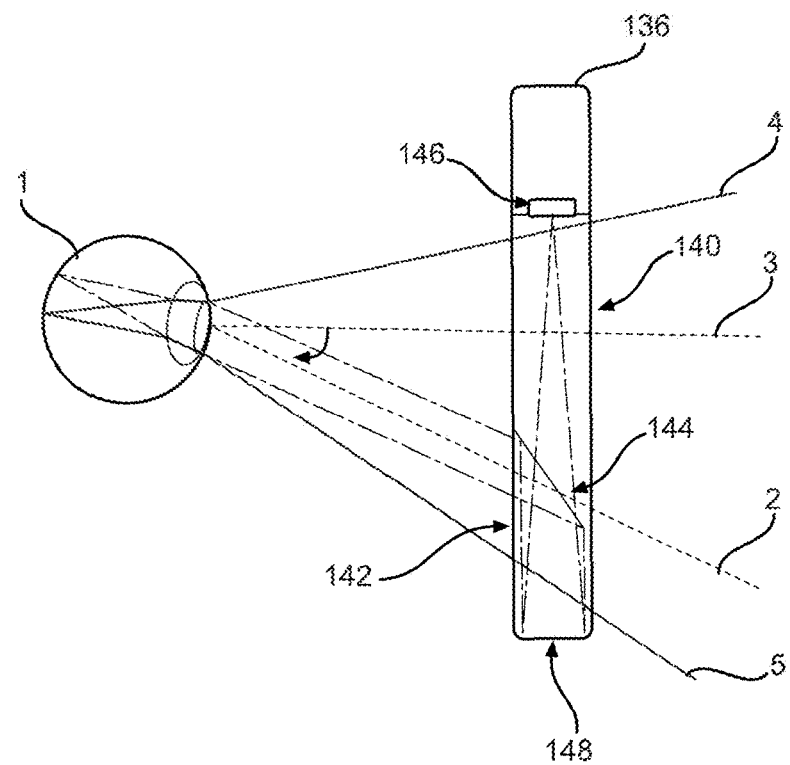
FIG. 4A illustrates a schematic diagram of a side view of a user looking through an example augmented reality device having a prism optical arrangement according to one embodiment of the present disclosure.

Transitioning to FIG. 4A, a schematic diagram of a side view of a user looking through an example augmented reality device having a prism arrangement is provided. In various arrangements, the disclosed monocle or augmented reality device can have a unibody prism that can have two parts coupled together. Unibody top prism 140 can be bonded or otherwise coupled to unibody bottom prism 142. Unibody top prism 140 can function both as a prism for device optics and a housing area for various internal electronic components, while unibody bottom prism 142 can function with unibody top prism 140 to provide virtual images for a user of the monocle in a unique manner.

The disclosed monocle or augmented reality device can use a reflective optical surface in conjunction with a folding prism to collect and project light from an optical display onto the retina of a user in a manner to provide a virtual display that is non-invasive with respect to being able to see real life objects in the environment of the user.

In various arrangements, the monocle can generally have two primary light paths with respect to the eye 1 of a user. A first light path 2 can be an optical display path for a virtual image. Light forming a virtual image can be projected into an optical prism 140, 142 from a micro-display or other optical display device 146 located within an upper housing 136 region downward past a combining optic 144, which can be a 50/50 dielectric material, for example. The virtual image along first light path 2 can then be directed toward a projecting optic 148, which can be spherical and have a reflective coating, such as an aluminum coating, for example. The virtual image along first light path 2 can then be collected at the projecting optic 148 and projected back up toward the combining optic 144 where the virtual image along first light path 2 is then redirected toward the user eye 1, where it can enter the user pupil and be focused on the user retina, as shown.

A second light path 3 can be a "see-through" or real object view path, which can be generated from the real life environment of the user. Second light path 3 can pass directly through the front and back flat surfaces of the optical prism 140, 142 unimpeded for a real object view to enter into the user eye and be focused on the user retina. In various embodiments, the virtual image display can be projected along first light path 2 at a downward angle slightly below the normal forward glancing vision of the user such that the virtual image display does not impede the normal vision of the user viewing real objects along second light path 3. As will be readily appreciated, the overall field of view of the user can have an upper bound or limit 4 and a lower bound or limit 5, and both the first light path 2 and the second light path 3 can fall within this overall field of view of the user.

Figure 4B:
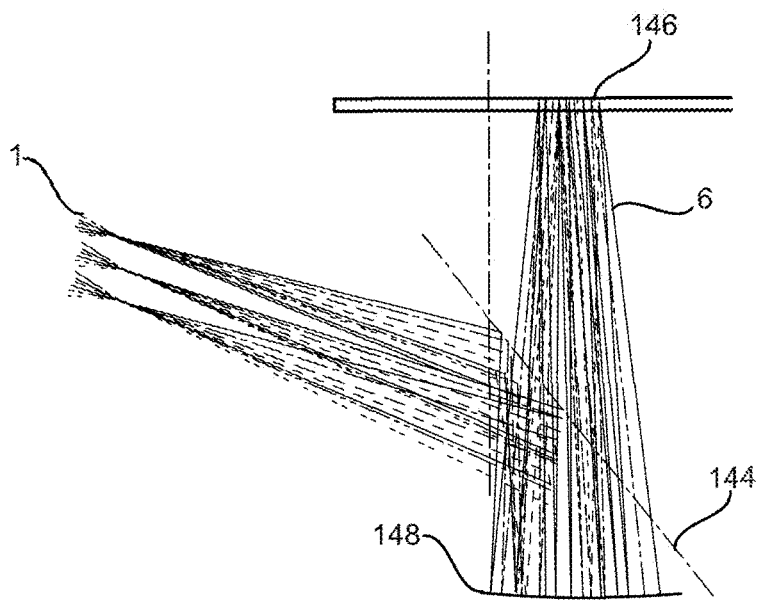
FIG. 4B illustrates a schematic diagram of light paths present in the augmented reality device of FIG. 4A according to one embodiment of the present disclosure.

FIG. 4B illustrates a schematic diagram of light paths present in the augmented reality device of FIG. 4A according to one embodiment of the present disclosure. Again, light 6 can be projected from an optical display 146, past combining optic 144, reflected off projecting optic 148 back to the combining optic, where it is then combined and directed toward user 1 as a virtual image 6. Various adjustments to the optical display 146, combining optic 144, projecting optic 148, and/or other optics components can be made to focus the final image for the user 1 in a customized manner, as will be readily appreciated.

Figure 5A:
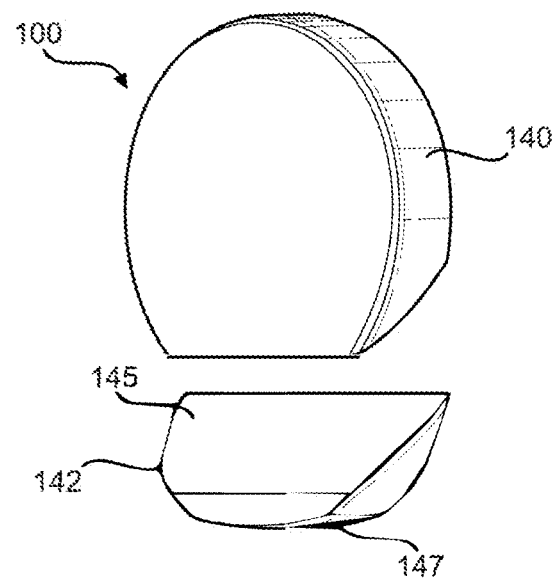
FIG. 5A illustrates in front perspective and partially exploded view an example augmented reality device according to one embodiment of the present disclosure.
Figure 5B:
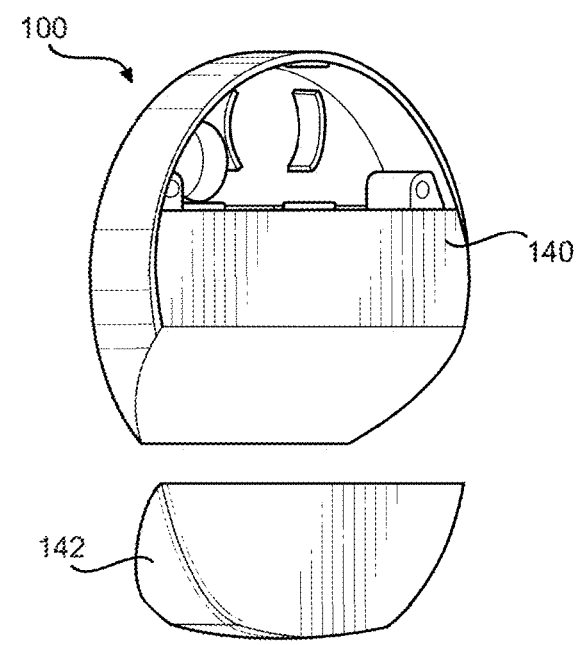
FIG. 5B illustrates in rear perspective and partially exploded view the augmented reality device of FIG. 5A with the back outer housing removed according to one embodiment of the present disclosure.

Continuing with FIGS. 5A and 5B an example augmented reality device with its back outer housing removed is illustrated in front perspective and partially exploded view and rear perspective and partially exploded view respectively. Again, monocle 100 can include a unibody top prism 140 and a unibody bottom prism 142 which can be bonded together in the finished monocle. A beam splitter 145 can be located along the top of unibody bottom prism 142 to split the projected light image before it is then combined by the combining optic. A reflection mirror 147 can be located along the bottom of unibody bottom prism 142 to reflect the projected light image back to the combining optic.

Figure 6:
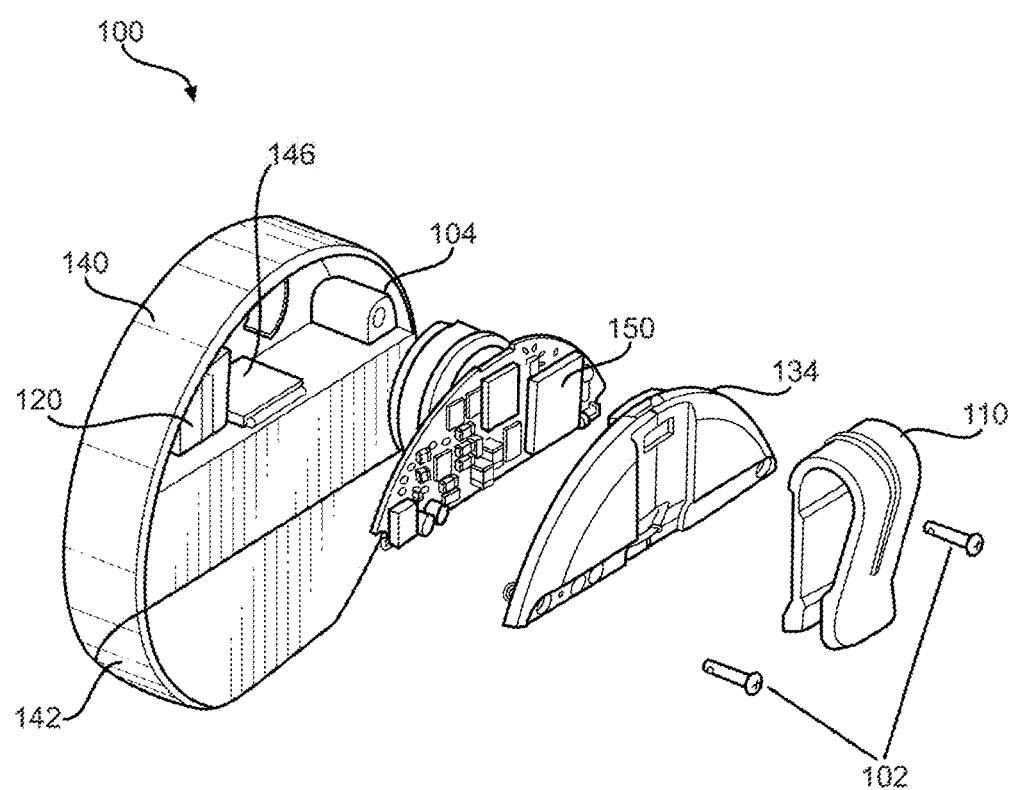
FIG. 6 illustrates in fully exploded view the augmented reality device of FIG. 5A according to one embodiment of the present disclosure.

FIG. 6 illustrates in fully exploded view the augmented reality device of FIG. 5A. As shown, monocle 100 can include a unibody top prism 140, a unibody bottom prism 142, an optical display device 146, a camera 120, a printed circuit board assembly 150, an outer housing back 134, and a clip 110, among various other components. One or more fasteners 102, which can be screws, for example, can fasten components together, such as through openings in outer housing back 134 and into mounting points 104 within unibody top prism 140. Again, unibody top prism 140 can house various electronic components, such as optical display device 146, camera 120, and printed circuit board assembly 150, which can include one or more processors and other electronic components. Optical display device 146 can be a micro-OLED, for example, although other types of display devices can be used.

Figure 7A:
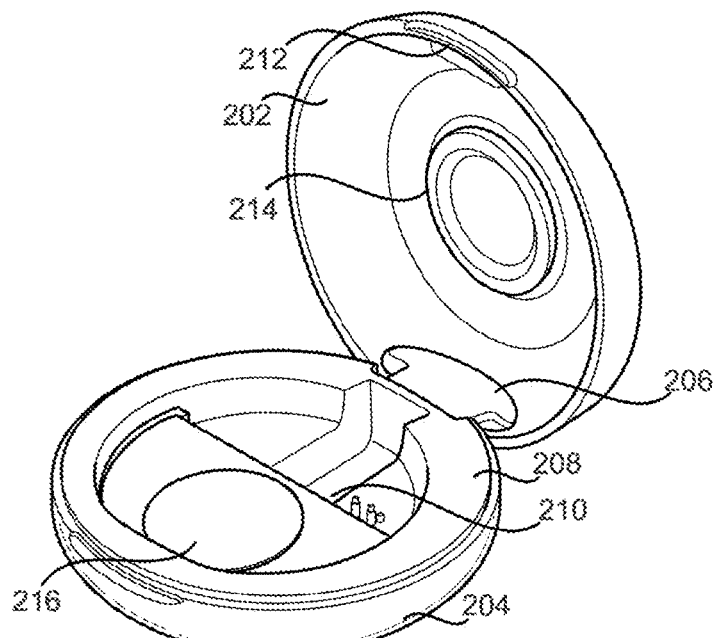
FIG. 7A illustrates in front perspective view an example charging case for an augmented reality device according to one embodiment of the present disclosure.
Figure 7B:
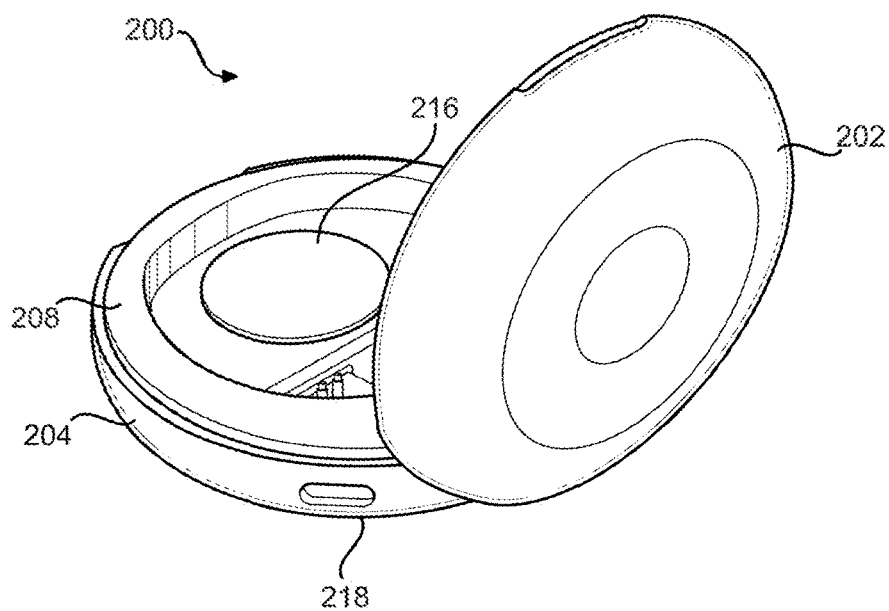
FIG. 7B illustrates in rear perspective view the charging case of FIG. 7A according to one embodiment of the present disclosure.
Figure 7C:
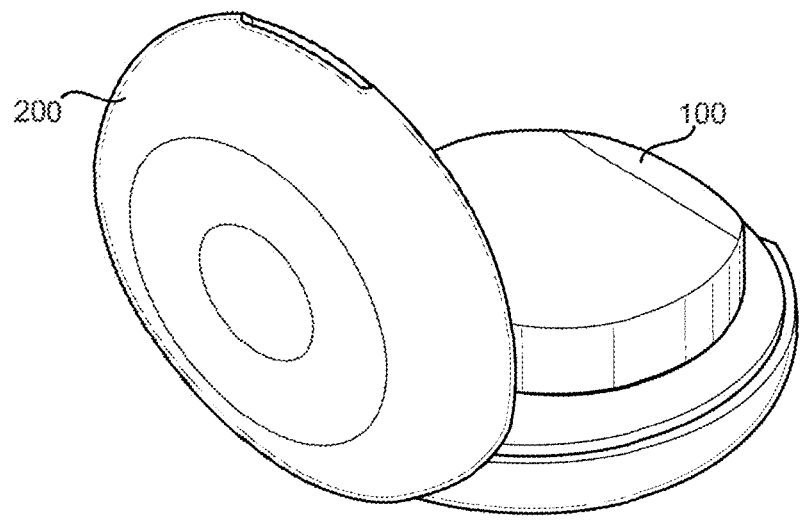
FIG. 7C illustrates in rear perspective view the charging case of FIG. 7A with an augmented reality device docked therein according to one embodiment of the present disclosure.
Figure 7D:
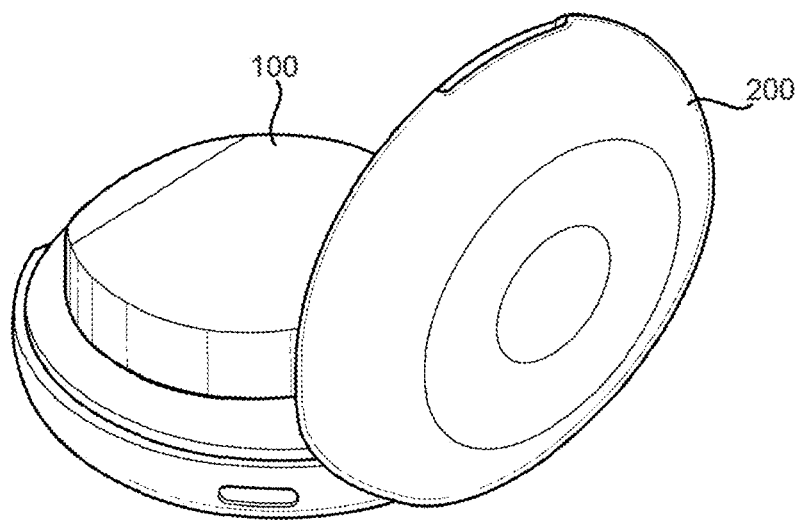
FIG. 7D illustrates in alternative rear perspective view the charging case and augmented reality device of FIG. 7C according to one embodiment of the present disclosure.
Figure 7E:
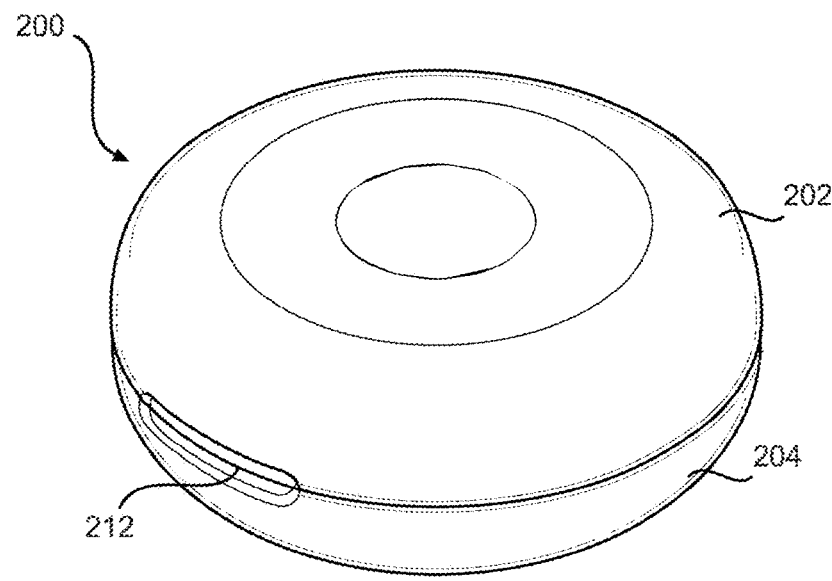
FIG. 7E illustrates in front perspective view the example charging case of FIG. 7A in a closed position according to one embodiment of the present disclosure.
Figure 7F:
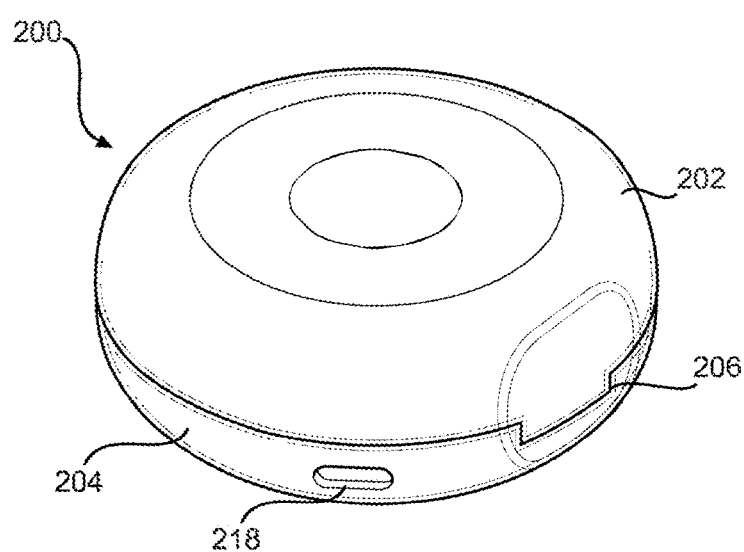
FIG. 7F illustrates in rear perspective view the example charging case of FIG. 7A in a closed position according to one embodiment of the present disclosure.

Moving next to FIGS. 7A-7F, an example charging case for an augmented reality device is shown in various views. FIGS. 7A and 7B depict charging case 200 in front perspective and rear perspective views respectively. FIGS. 7C and 7D illustrate charging case 200 with an augmented reality device 100 docked therein in rear perspective and alternative rear perspective views respectively. FIGS. 7E and 7F show charging case 200 in a closed position in front perspective and rear perspective views respectively.

Charging case 200 can have a lid 202 and a base 204, which can be coupled by way of a hinge 206 or other suitable coupling arrangement. Base 204 can carry a tray 208, which tray can be sized and shaped to contain a monocle or other augmented reality device therein. Lid 202, base 204, and tray 208 can be formed from molded plastic material, for example, although other types of materials can be used. In various arrangements, lid 202 can be connected to base 204 and tray 208 by way of pins, which can be formed from steel, for example.

One or more pogo pins 210 or other suitable electrical connectors can be located within base 204, and these pogo pins can be configured to electrically couple to a monocle docked within charging case 200 in order to charge the monocle. A magnet 212 located on lid 202 can facilitate locking the case closed when the lid is placed against base 204. A top silicone sticker 214 or another soft component can be located on an under side of lid 202, while a bottom silicone sticker 216 or another soft component can be located within tray 208. These silicone stickers 214, 216 or other soft components can function to protect a docked monocle from scratches or other damage.

A communications port 218 can be located on an outer surface of base 204 and can facilitate communications with an outside device. For example, an outside computer, phone, tablet or other device can be coupled to communications port 218 in order to communicate with a monocle or other augmented reality device docked within charging case 200. Communications port 218 can be a USB-C port, for example, although other types of ports can also be used. Charging case 200 can also include a battery, such as a lithium-ion rechargeable battery, for example, although other types of batteries may also be used. The battery can charge a docked monocle or other augmented reality device by way of pogo pins 210. In some arrangements, the monocle or other augmented reality device can be held in place by magnets when docked.

In some arrangements, charging case 200 can function simply as a battery, such as to recharge a docked monocle or other augmented reality device. In other arrangements, charging case 200 can be more active and provide additional functions. For example, charging case 200 can be configured to receive images stored on a docked monocle and store them to a separate memory, such as an SD card. Charging case 200 can also be plugged into a computer, smart phone, or other computing device by way of communications port 218, such that images can be taken from a docked monocle and stored to the other computing device.

In various arrangements, charging case 200 may also be configured to accept user inputs, such as through one or more buttons, touchpads, IMU or other haptic feedback sensors, and/or other types of user input components. Wireless communications with outside devices may also be possible and wired connections may transfer data as well as provide power, such that extended operation of the charging case and docked monocle may be possible.

Figure 8:
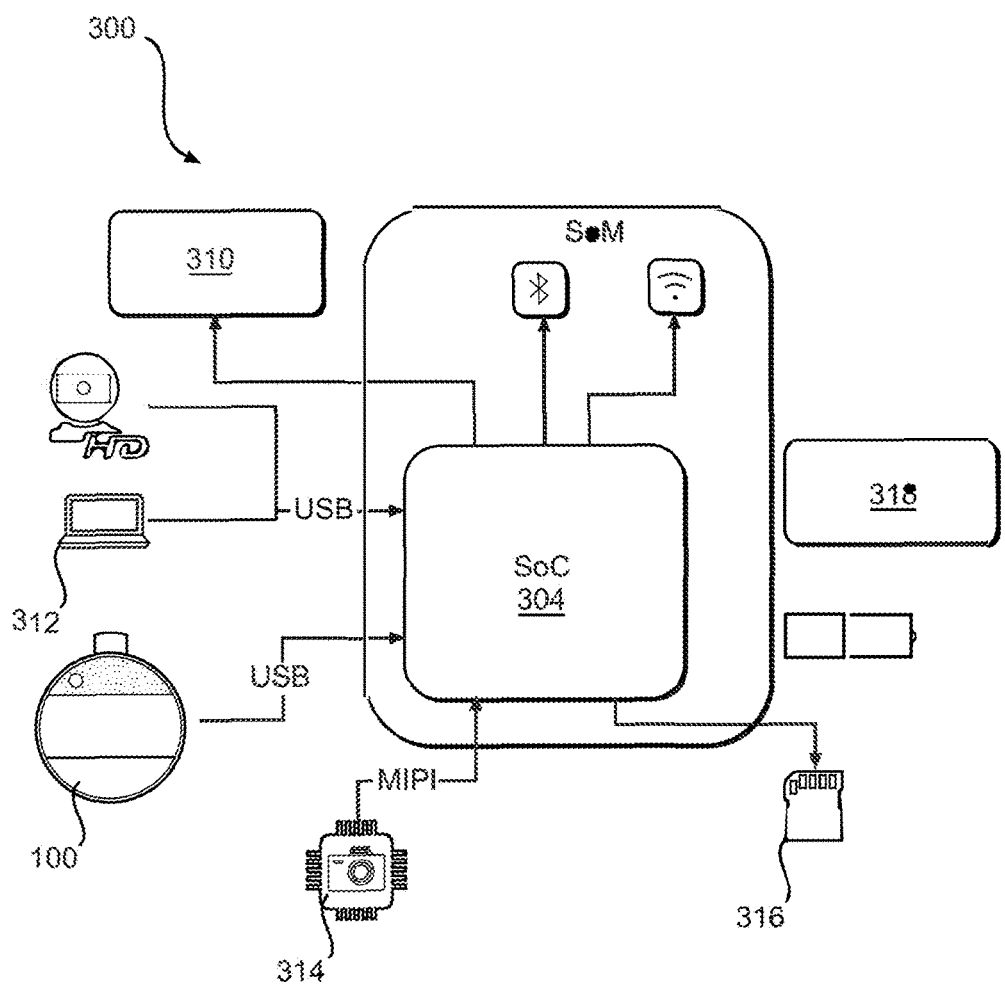
FIG. 8 illustrates a schematic diagram of an example electronic system having an augmented reality device according to one embodiment of the present disclosure.

Transitioning next to FIG. 8, a schematic diagram is provided of an example electronic system having an augmented reality device. Electronic system 300 can include various components related to monocle 100. A primary system-on-module 302 can include a system-on-chip 304 having various communications connections to different system components. Such communications connections can include various wireless connections, such as, for example, Bluetooth and Wifi, as well as various wired connections, such as, for example, USB, MIPI, and the like. Different system components can include monocle 100, one or more outside processors 310, one or more outside computers 312, one or more other cameras 314, one or more outside storage devices 316, which can be used to store various buffer clips, and one or more outside input devices 318, among other possible components.

Figure 9A:
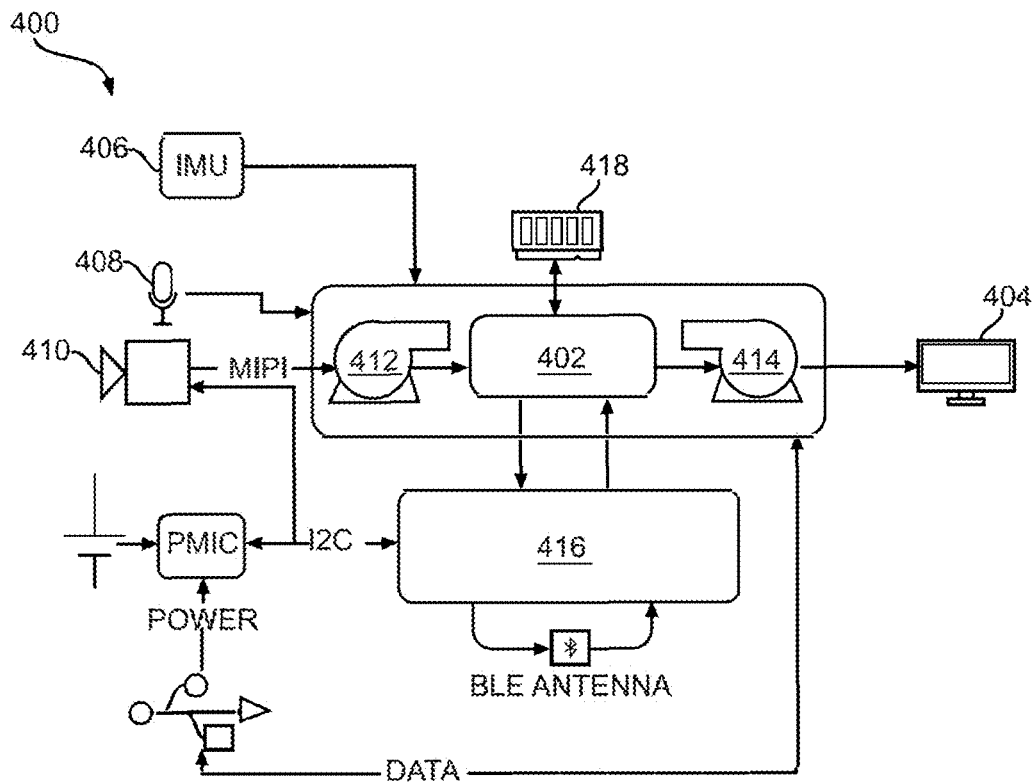
FIG. 9A illustrates a schematic diagram of an example traffic manager and software module arrangement of an electronic system having an augmented reality device according to one embodiment of the present disclosure.

FIG. 9A illustrates a schematic diagram of an example traffic manager and software module arrangement of an electronic system having an augmented reality device. Arrangement 400 can include a traffic manager 402, which can receive inputs from a variety of devices and provide outputs to one or more devices, such as an OLED display 404. OLED display can correspond to optical display device 146 on monocle 100 above. A built in speaker (not shown) may also provide audio outputs in some arrangements. Inputs can include, for example, those coming from an inertial measurement unit ("IMU") 406, a microphone 408, and/or a camera 410 (which can correspond to camera 120 above), among other possible inputs.

Traffic manager 402 can be located on the monocle or other augmented reality device, so as to minimize data transfer issues. As such, a compression module 412 feeding images, video and/or other data to traffic manager 402 and a decompression module 414 receiving images, video, and/or data from the traffic manager can also be located on the monocle itself. Traffic manager 402 can be in communication with a wireless communications module 416, which can be Bluetooth Low Energy ("BLE") enabled, for example. Wireless communications module 416 can also have its own processor, touch controller, and/or BLE antenna in some arrangements. One or more memory units 418, such as a UFS NAND flash memory can be coupled to traffic manager 402, and such memory units can also be located on the monocle device itself.

Figure 9B:
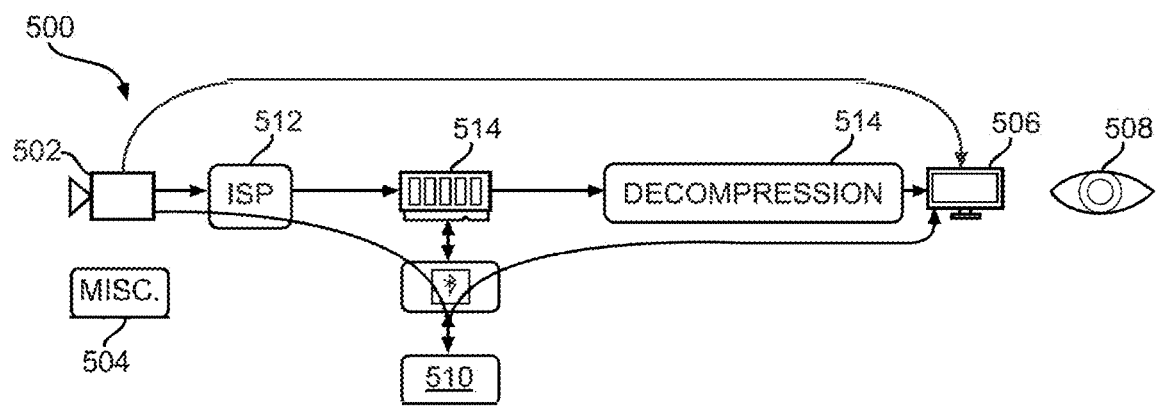
FIG. 9B illustrates a schematic diagram of an example communications arrangement for an electronic system having an augmented reality device according to one embodiment of the present disclosure.

FIG. 9B illustrates a schematic diagram of an example communications arrangement for an electronic system having an augmented reality device. Communications arrangement 500 can involve one or more inputs, such as images captured by a camera 502 and/or sound captured by a microphone 504, one or both of which can be located on a monocle or other augmented reality device. Such input(s) can be provided directly to a display 506 and/or speaker on the monocle for viewing and listening by a user 508. In addition, such input(s) can also be provided to one or more outside devices 510, such as a smart phone, computer, or the like. Transmission can be by way of an ISP 512 or other communications provider. Such input(s) can also be stored in one or more memory devices 514. All or any combination of these input provisions can take place simultaneously for the same input(s), and a decompressor 516 can be used for such input(s) as may be necessary.

In addition to the foregoing details, the disclosed monocle or other augmented reality device can have various other features. Where wired connections are used, a USB connection can facilitate communication with another device, such as another body worn device, for example, for power and/or data transfer. In addition to providing stored images and/or audio captured by the monocle, the monocle display can also show live video from the monocle camera, as well as video and/or audio from other sources. In addition, the display can include annotations or other indicators with respect to real life objects in the actual field of view.

In various arrangements, the monocle can have zoom, pan, and tilt features using the onboard camera, such that magnified real view images can be presented to the user, and these functions can be performed digitally and/or in analog. The monocle can also take single higher resolution pictures that are stored to local memory.

Figure 10A:
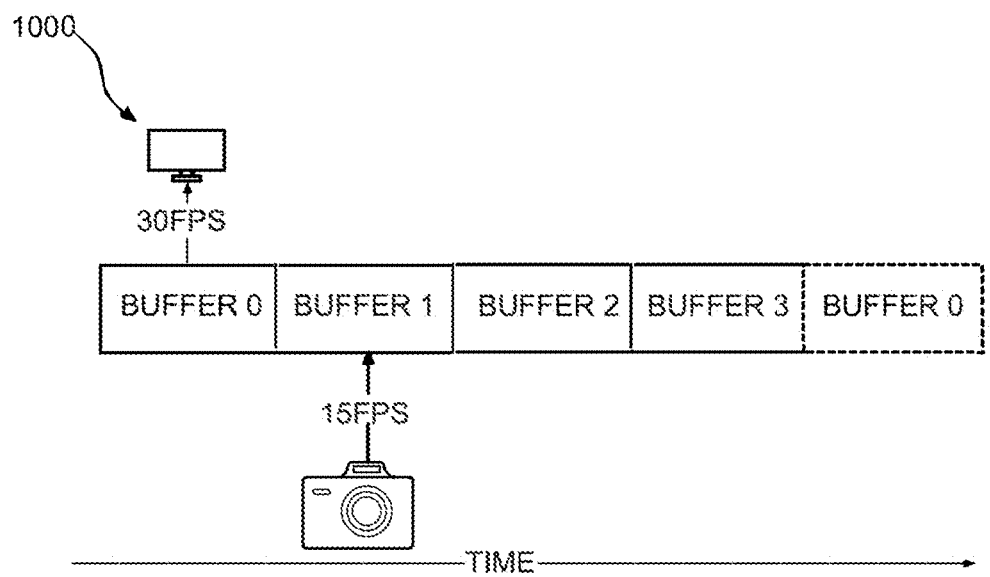
FIG. 10A illustrates a schematic diagram of an example buffer sequence for an augmented reality device according to one embodiment of the present disclosure.

While ordinary buttons can be used, a touch sensitive user interface surface can also be used for tapping or sliding motions. For example, a slide motion along a touch sensitive user interface can be used to advance or rewinds a given image playback. Speed of slide motion can also affect the speed of advance or rewind on a given buffer clip. An onboard accelerometer or IMU can also be used as a user interface by capturing head movements or other user movements, and an onboard microphone can capture audio from the user and/or the user environment. The microphone and IMU may be used either in isolation or together to implement a tap-based gesture interface FIG. 10A illustrates a schematic diagram of an example buffer sequence for an augmented reality device. In various embodiments, the disclosed monocle can capture visual images and/or audio and save those visual images and/or audio as media clips to one or more buffers stored on the monocle itself. The monocle can write and rewrite a constant circular replay buffer of video for a set amount of time, such as, for example 30 seconds. This process can be performed continuously and can take place automatically or at the command of the user. In some arrangements, the user can provide one or more inputs that instruct the monocle to save a particular buffer segment without rewriting over that buffer segment. Saved buffer segments can then be replayed on demand. Such demand can be made by way of one or more user inputs, such as, for example, a button push, use of an onboard IMU or touch sensitive interface, or a user gesture or voice command, as well as through an outside device, such as a smart phone, smart watch, computer, or the like. Each buffer can be stored temporarily or permanently on the monocle and can also be offloaded to an outside device.

Multiple buffers can be used to store various events. As shown in buffer sequence 1000, for example, a rotating sequence of four separate rewritable 30 second buffers can be used to temporarily store visual and/or audio data in real time as the user wears the monocle. If the user desires a particular sequence to be preserved, then a command can be given to store one or more buffer sequences to a kept memory location. If no such command is given, then each rewritable buffer can be written over with new data. Of course, more or fewer than four buffer segments can be used, and time lengths longer or shorter than 30 seconds can also be used. Captured images and/or audio can be streamed to the user as soon as may be practical, depending on remaining battery capacity and/or other operational factors.

Figure 10B:
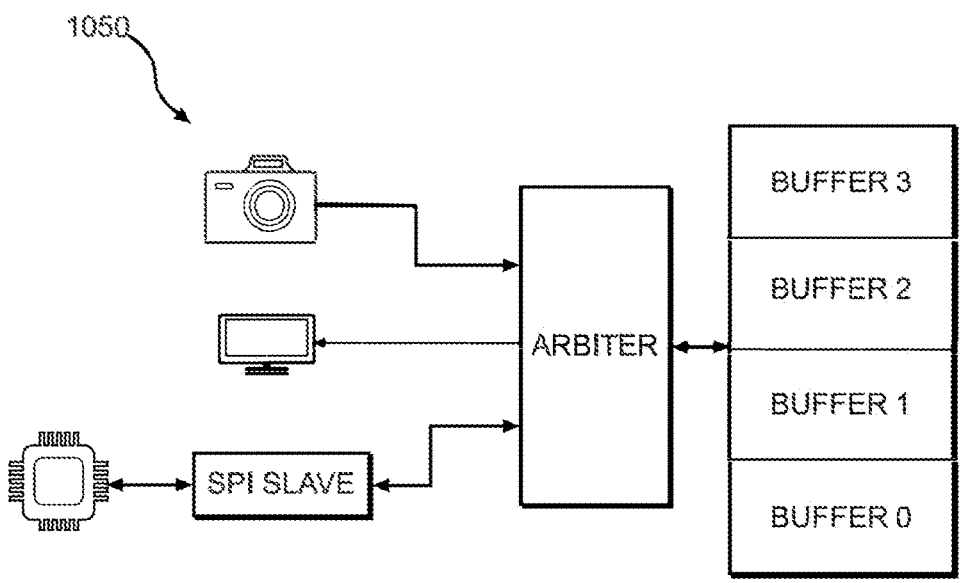
FIG. 10B illustrates a schematic diagram of an example buffer management arrangement for an electronic system having an augmented reality device according to one embodiment of the present disclosure.

FIG. 10B illustrates a schematic diagram of an example buffer management arrangement for an electronic system having an augmented reality device. Arrangement 1050 can include an arbiter or other processing component or module that controls the capturing and storing of visual image and/or audio inputs into different buffer segments. These buffer segments can be provided to an onboard monocle display, can be provided to an onboard monocle storage, or both. The arbiter can also control the rewriting of new material onto buffer segments, which can be rotated and overwritten.

Figure 11:
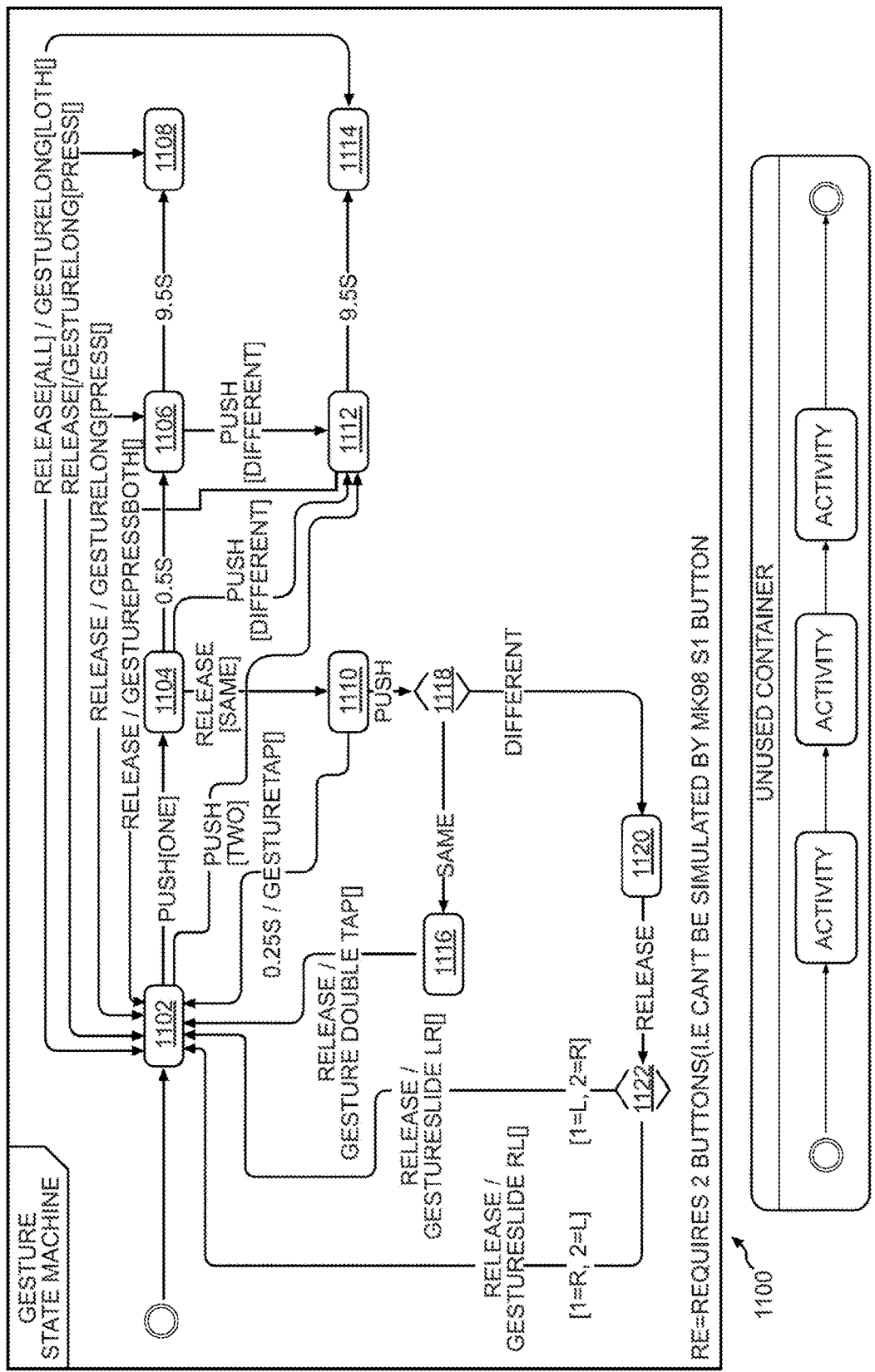
FIG. 11 illustrates a schematic diagram of an example gesture state processing arrangement for an augmented reality device according to one embodiment of the present disclosure.

FIG. 11 illustrates a schematic diagram of an example gesture state processing arrangement for an augmented reality device. Gesture state processing arrangement 1100 can include considerations for gesture states for a first input device (e.g., a button or touch surface) such as idle 1102, triggered 1104, pressed short 1106, and pressed long 1108. A certain amount of time, such as five seconds, for example, can separate each of these gesture states for the first input device. Gesture states for a second input device (e.g., a second touch surface) can include tapped 1110, both pressed 1112, and both pressed long 1114. An initial gesture state 1116 can involve whether either button or touch surface has been pressed or touched, upon which a gesture state inquiry 1118 can determine which button or touch surface has been pressed or touched. In various arrangements involving touch surfaces, a slid gesture state 1120 can also be used. A compare actuated buttons/touch surfaces gesture state 1122 may also be implemented.

Figure 12:
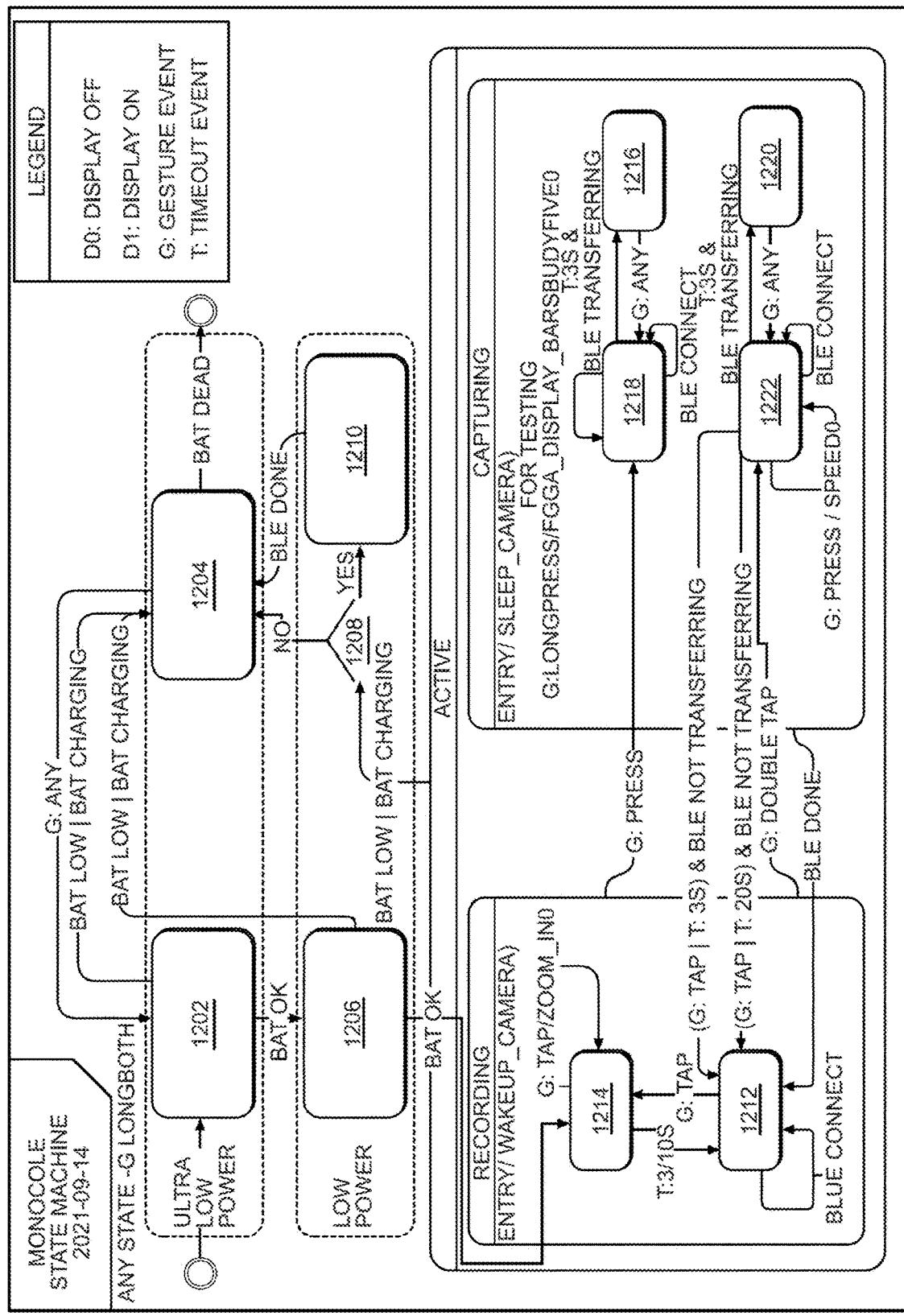
FIG. 12 illustrates a schematic diagram of an example state machine arrangement for an augmented reality device according to one embodiment of the present disclosure.

FIG. 12 illustrates a schematic diagram of an example state machine arrangement for an augmented reality device. The disclosed monocle can be a state device, and state machine arrangement 1200 can reflect various possible states for the monocle. An early initiation state 1202 can involve ultra-low device power situations, such as in the case of a low battery, which can then result in a powered down state 1204. A full initiation state 1206 can involve low device power situations, which can cause transfer 1208 of vital data or assets and result in a shutdown pending state 1210. Normal powered conditions can involve fully active device states within the realms of recording and capturing. Recording states can include a Record_D0 (home state) state 1212 and a Record_D1 state 1214. Capturing states can include a Photo_D0 state 1216 and a Photo_D1 state 1218. Capturing states can also include a Replay_D0 state 1220 and a Replay_D1 state 1222.

Various example methods of operation for an augmented reality device will now be provided. It will be understood that the methods provided here are examples for purposes of illustration, and that many variations and other methods of use are also possible for the disclosed augmented reality devices and systems.

Figure 13:
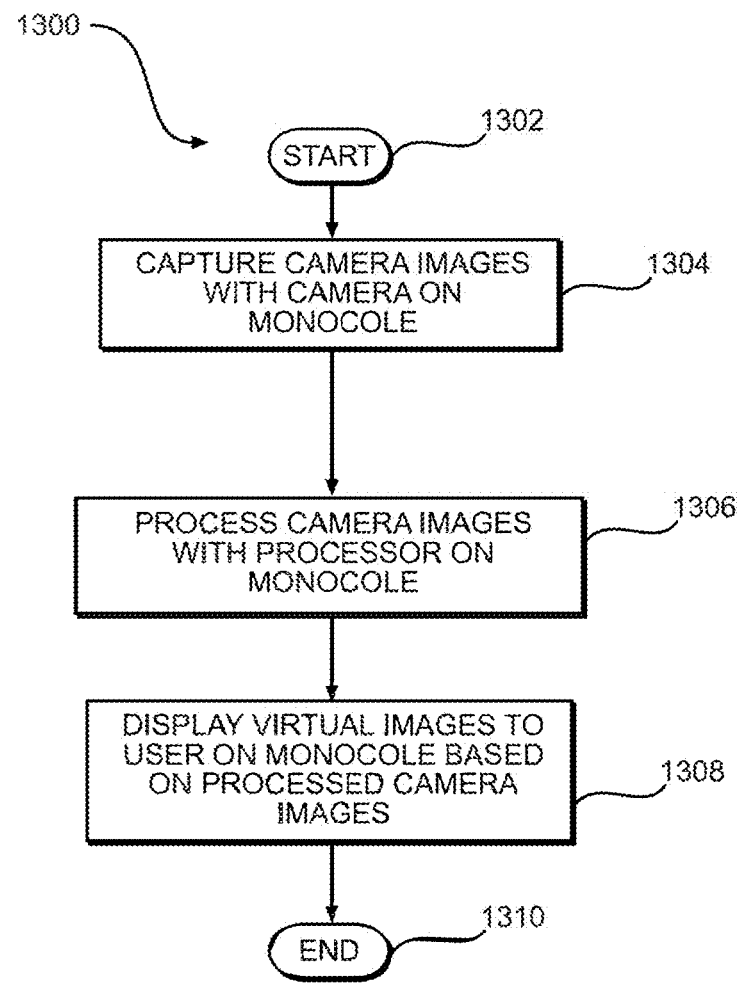
FIG. 13 illustrates a flowchart of an example method of operating an augmented reality device according to one embodiment of the present disclosure.

FIG. 13 illustrates a flowchart of an example method of operating an augmented reality device. In various embodiments, method 1300 can be applied using the various systems, devices, and features provided above. Some or all of the steps of method 1300 can be automatically performed, such that the entire method can be considered a computer-implemented method in some arrangements.

After a start step 1302, a first process step can involve capturing camera images on the monocle or other augmented reality device. As noted above, this can be accomplished using a camera that is located on or within the monocle itself. Capturing images on the monocle can take place automatically, as a result of one or more user inputs, or both.

At a following process step 1306, the captured camera images can be processed using a processor on the monocle or other augmented reality device. Such a processor can be located within an outer housing of the monocle, such as within a unibody top prism region. Camera image processing can involve altering the images, organizing the images, such as into buffer segments, and/or storing the images, among other possible image processing functions.

At the next process step 1308, virtual images can be displayed to a user on the monocle or other augmented reality device based on the processed camera images. Displaying the virtual images can involve projecting the processed camera images through an optical system located within the monocle, as detailed above. Again, the display of virtual images can be done in a manner that does not impede the ability of the user to view the real life user environment. For example, the virtual image display can be along a light path that is separate from a straight ahead real life view path, such as downward from the straight ahead view path or in another direction within the peripheral view of the user. The method then ends at end step 1310.

It will be appreciated that the foregoing method 1300 may include additional steps not shown, and that not all steps are necessary in some embodiments. For example, additional steps may include providing the monocle or other augmented reality device, communicating with one or more outside electronic devices, or stopping the display of virtual images. Other process steps can involve focusing the virtual images in a customized manner for the user or speeding up or slowing down the display of virtual images, among other possible actions. Furthermore, the order of steps may be altered as desired, and one or more steps may be performed simultaneously. For example, process steps 1304-1308 can all be performed simultaneously, which may take place on the same or different images.

Figure 14:
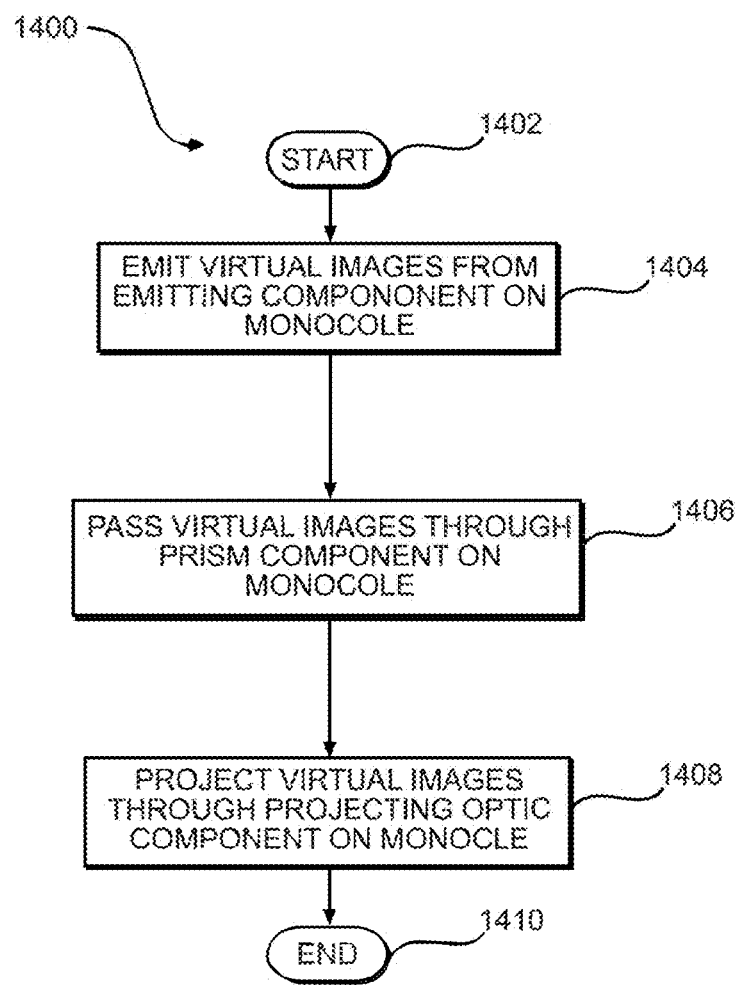
FIG. 14 illustrates a flowchart of an example method of displaying virtual display images on an augmented reality device according to one embodiment of the present disclosure.

Next, FIG. 14 illustrates a flowchart of an example method of displaying virtual display images on an augmented reality device. In various embodiments, method 1400 can be applied using the various systems, devices, and features provided above. Some or all of the steps of method 1400 can be automatically performed, such that the entire method can be considered a computer-implemented method in some arrangements. In various embodiments, all of method 1400 can be considered a detailed process of step 1308 in method 1300 above.

After a start step 1402, a first process step 1404 can involve emitting virtual images from an image emitting component located on the monocle or other augmented reality device. Again, this can be a micro-display or other optical display device located within an upper housing region of the monocle. In some arrangements, the virtual images can be emitted downward from the image emitting component to other optical components within the monocle.

At the next process step 1406, the virtual images can be passed through a prism component located on the monocle or other augmented reality device. As noted above, such a prism component can be a folding prism having a top prism component and a bottom prism component bonded together to form a unibody prism.

At a following process step 1408, the virtual images can be projected through a projecting optic component located on the monocle or other augmented reality device. Again, such a projecting optic can be spherical and can have a reflective coating, such as an aluminum coating, for example. The method then ends at end step 1410.

It will be appreciated that the foregoing method 1400 may include additional steps not shown, and that not all steps are necessary in some embodiments. For example, additional steps may include passing the virtual images past a combining optic on a first pass, and then collecting the images at the combining optic after they have been projected through the projecting optic. The virtual images can then be redirected from the combining optic to the eye of the user. The order of steps may be altered as desired, and one or more steps may be performed simultaneously. For example, process steps 1404-1408 can all be performed simultaneously during a continuous displaying of virtual images.

Figure 15:
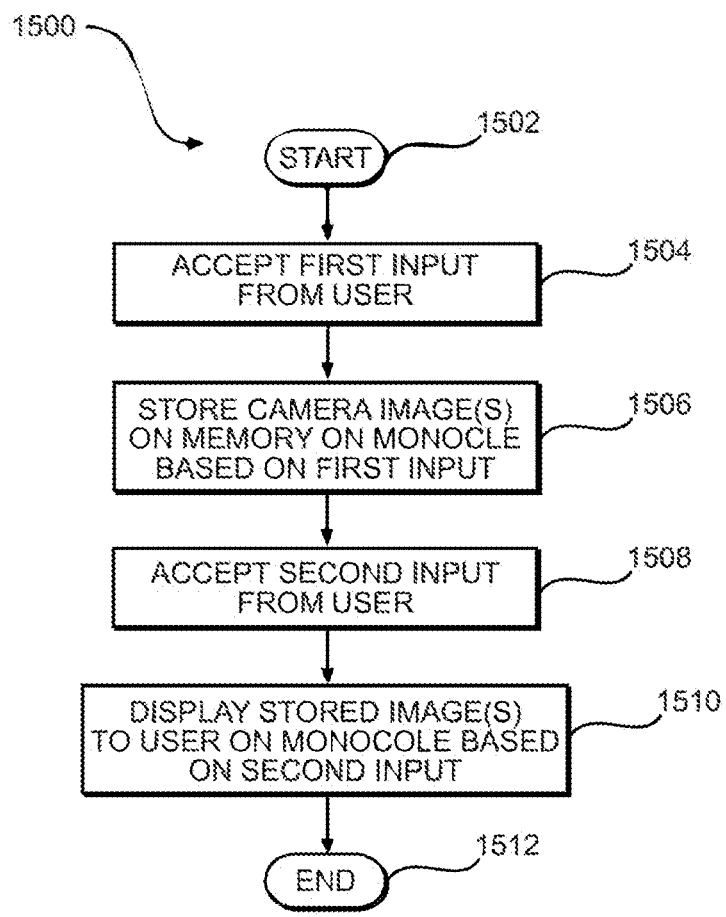
FIG. 15 illustrates a flowchart of an example method of operating an augmented reality device based on user inputs according to one embodiment of the present disclosure.

Finally, FIG. 15 illustrates a flowchart of an example method of operating an augmented reality device based on user inputs. In various embodiments, method 1500 can be applied using the various systems, devices, and features provided above. Some or all of the steps of method 1500 can be automatically performed, such that the entire method can be considered a computer-implemented method in some arrangements. In various embodiments, method 1500 can be considered in addition to method 1300 or method 1400 above, and it will be readily appreciated that some processes may include all steps from all of methods 1300, 1400, and 1500.

After a start step 1502, a first process step 1504 can involve accepting a first input from a user of the monocle or other augmented reality device. Such a first user input can be any of a variety of inputs. Possible user inputs can include, for example, a button push on the monocle, a voice command, a gesture, user motion (which may be detected by an internal accelerometer), and/or various possible inputs on an outside device in communication with the monocle, such as a computer, smart phone, smart watch, charging case, or the like. Other user inputs are also possible.

At a following process step 1506, one or more camera images can be stored in a memory located on the monocle or other augmented reality device based on the first user input. Such camera images can be organized and stored in one or more buffers in the onboard memory. In some arrangements, additional camera image storage can take place in one or more memory devices located outside the monocle as well. Such additional storage can involve the same camera images stored in the onboard memory, different camera images, or both.

At the next process step 1508, a second input can be accepted from the user. Again, such a second user input can be any of a variety of user inputs, as listed above for process step 1504. Second user input can be the same type of user input for the first user input, or it can be a different type of user input. For example, the first user input can be a voice command and the second user input can be a button push on the monocle. Other combinations of user inputs are also possible, and it is contemplated that all such combinations may be used.

At subsequent process step 1510, the one or more stored images can be displayed to the user on the monocle or other augmented reality device based on the second user input. The displayed images can be provided by way of the optical arrangement detailed above, and the user can view the displayed images by looking toward them. For example, the displayed images can be shown within the monocle at an angle that is slightly below a straight ahead viewing angle, such that the user can simply look downward within the monocle to see the displayed images. The method then ends at end step 1512.

Similar to foregoing methods 1300 and 1400, it will be appreciated that method 1500 may include additional steps not shown, and that not all steps are necessary in some embodiments. For example, additional steps may include accepting a third user input that affects the manner in which the displayed images are provided. Such a third user input might control the zoom level, display angle, playback speed, and/or other aspects of the displayed images. The order of steps may be altered as desired, and one or more steps may be performed simultaneously. For example, process steps 1506 and 1510 can be performed simultaneously during a continuous process of storing and displaying various images.

Figure 16:
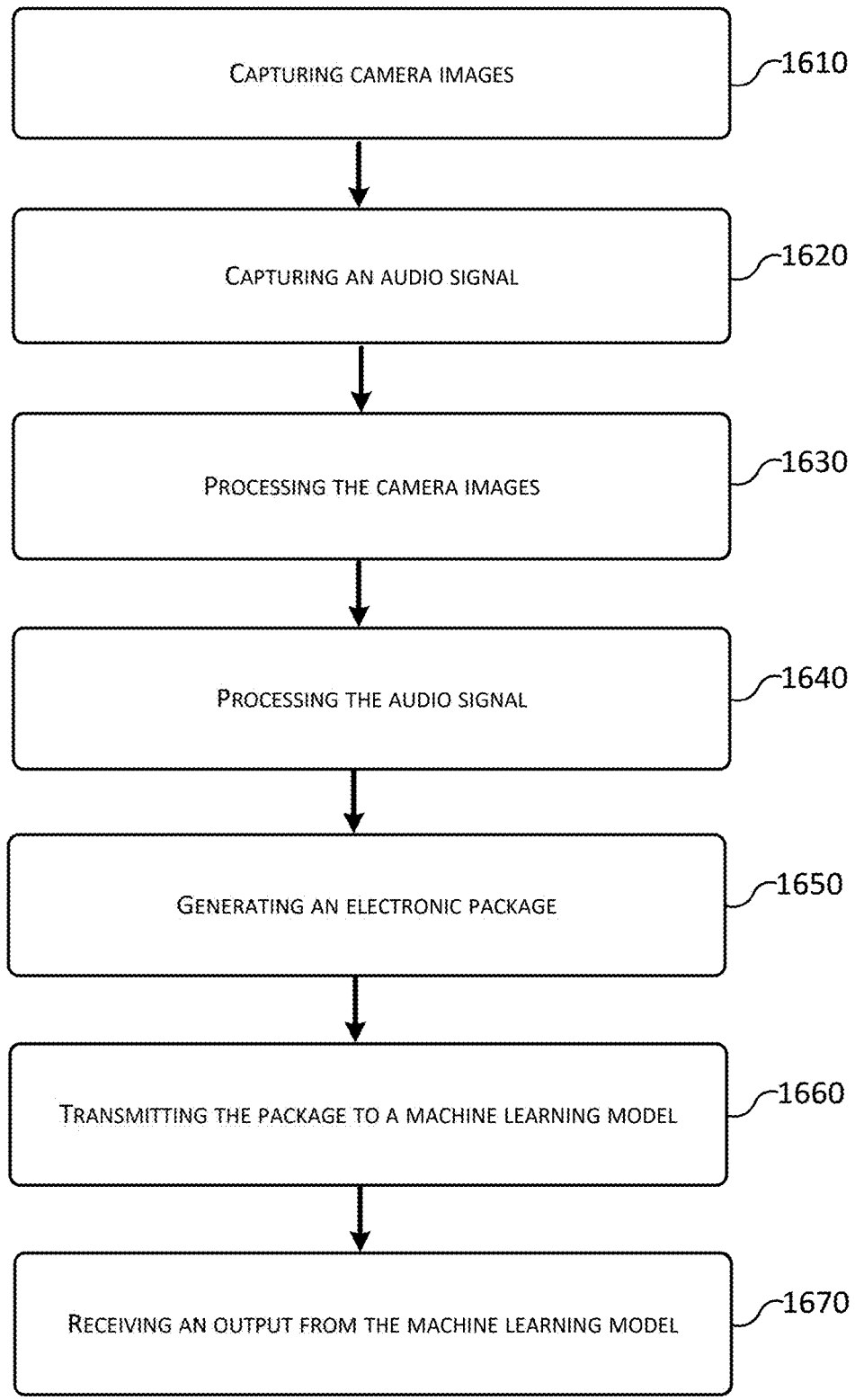
FIG. 16 illustrates a flowchart of an example method of operating an augmented reality device based on user inputs according to one embodiment of the present disclosure.

FIG. 16 illustrates a flowchart of an example method 1600 of operating an augmented reality device based on user inputs according to one embodiment of the present disclosure.

In step 1610, an augmented reality device captures one or more images using a camera disposed within an augmented reality device worn by a user. The augmented reality device may be a device as described herein. In some embodiments, the augmented reality device includes an outer housing having a front and a back that are transparent and arranged to allow the user to see therethrough. An attachment component is coupled to the outer housing and configured to render the augmented reality device as wearable by the user. A microphone is disposed within a portion of the augmented reality device. The camera is disposed within the outer housing. A display arrangement is disposed within the outer housing and configured to provide a virtual display to the user while the user is looking through the augmented reality device. The augmented reality device includes one or more processors.

In step 1620, the augmented reality captures a first audio signal from the microphone of the augmented reality device. For example, a wearer of the device may speak and the augmented reality device captures and generates a first audio signal of the speech of the user.

In step 1630, the augmented reality device processes, using the one or more processors, the captured one or more images. For example, the augmented reality device may perform image processing to modify properties of the one or more images (such as color, contrast, saturation, brightness, luminance, etc.). The augmented reality device may perform object detection and sub-image extraction of the identified objects in the one or more images. The augmented reality device may classify the type of the objects detected in the one or more images.

In step 1640, the augmented reality device processes, using the one or more processors, the first audio signal. The augmented reality device may convert an audio signal from speech-to-text. An audio signal may be converted to text or characters. Moreover, the augmented reality device may process the audio signal to determine an intent, emotional, emphasis, tone, etc. by evaluating properties of the audio signal such as amplitude, cadence, word combination etc.

In step 1650, the augmented reality device generates, using the one or more processors, an electronic package (such as electronic package, file, data stream, etc.). The electronic package may include: a portion of the audio signal, a processed version of the audio signal, a portion of the one or more images, a processed version of the one or more images. The electronic package may optionally include a context of the augmented reality device. The context of the augmented reality device (described further below) provides current, historical or predicted context of the augmented reality device or of the wearer of the augmented reality device. For example, the context may include any one of the following information: a date and/or time of the augmented reality device, a position and/or location of the augmented reality device, data about a wearer of the device (a heart rate or pulse, a blood oxygen level, a blood pressure and/or a temperature).

In step 1660, the augmented reality device transmits or provides for input the electronic package to one or more machine learning models. The augmented reality device prepares an electronic package including this data to be transmitted and/or input into a machine learning model or an online service providing machine learning model processing.

In some embodiments, a machine learning model may include a large language model, also known as an LLM. LLMs are machine learning models that use deep learning algorithms to process and understand natural language input, textual input, audio signal input and/or image or video input. Typically, these models are trained on massive amounts of data to learn patterns and establish entity relationship in the data. Some examples of popular LLM are BERT (Bidirectional Encoder Representations from Transformers) developed by Google, GPT-3 (Generative Pre-trained Transformer 3) developed by OpenAI, GPT-4 (Generative Pre-trained Transformer 4) developed by OpenAI, T5 (Text-to-Text Transfer Transformer) developed by Google, RoBERTa (Robustly Optimized BERT Pretraining Approach) developed by Facebook AI Research). Many of these LLMs are transformer models based on a transformer architecture. The machine learning models and LLMs may be part of an online service, may reside on one or more services, and may partially be resident on the augmented reality device.

For example, the augmented reality device may access and interact with the machine learning models via application program interfaces, RESTful API, online user interfaces, and other known methods to interface with a machine learning model. The application program interfaces allow interaction and the provision of input data to the machine learning model(s) and receive out from the machine learning model(s). For example, the augmented reality device may interact with ChatGPT Plus to interface with GPT-3 and/or GPT-4. In another example, the augmented reality device may interact with OpenAI via the OpenAI API.

In step 1670, the augmented reality device receives an output from the one or more machine learning models. The augmented reality device may display output via a display device. In some embodiments, in response to the received output, the augmented reality device may provide a new or updated generated package and provide the new updated for input to the one or more machine learning models.

Figure 17:
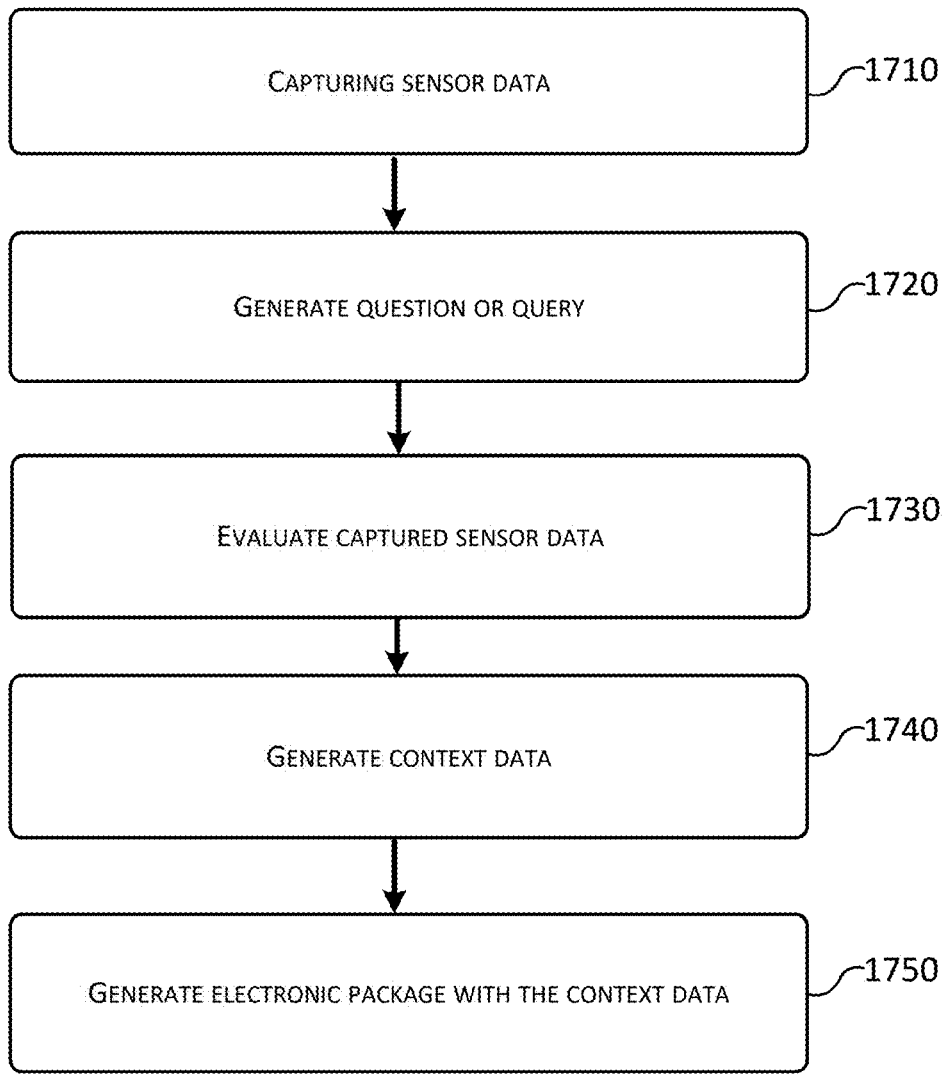
FIG. 17 illustrates a flowchart of an example method of operating an augmented reality device based on user inputs according to one embodiment of the present disclosure.

FIG. 17 illustrates a flowchart of an example method 1700 of operating an augmented reality device based on user inputs according to one embodiment of the present disclosure.

In step 1710, the augmented reality device captures or collects sensor data. As described herein, the augmented reality device may include multiple sensors that capture environmental and states of the augmented reality device. Sensor data may be periodically captured by the augmented reality device over a period of time.

In step 1720, the augmented reality device generates a question or a query. A question or query is created that will be used as an input to the machine learning model. In some embodiments, the question or query may be derived from a received audio signal where the received audio signal is processed via a speech-to-text conversion operation. In some embodiments, the question or the query is an audio file containing an audio signal of the speech spoken by the wearer of the augmented reality device. In some embodiments, the augmented reality device includes a pre-set listing of questions that may be submitted to the machine learning model, such as "What should I do next?", "Where should I go now", "What should I eat?", etc.

In step 1730, the augmented reality device evaluates or processes the captured sensor data. The augmented reality device may process the collected data and determine relevant data to be used in conjunction with a query, question and/or other input for a machine learning model.

In step 1740, the augmented reality device generates contextual data. Context data from the collected data is generated. For example, the augmented reality device may create context data from current and/or historic position or location data. The sensor data used to generate the context data may be associated with the pre-set listing of questions. For example, if a particular question is selected or asked, the augmented reality device may select sensor data that is relevant or that has been associated with the question or the type of question. Different sensor data may be associated with a question of "Where should I go now", such as current and historic location or positional data. Also, current historic location or positional data may be associated with the question of "What should I eat?"

Moreover, the augmented reality device may use preferences or other stored information to augment the query or question. A question may be augmented, for example, with key words or other text to influence the results that would be generated by the machine learning model. For example, the augmented reality device may include a data store such as a database or knowledge graph with key preferences or other information about the augmented reality device or the user of the device. For example, a knowledge graph may be configured to provide a ranking or emphasis of information. The knowledge graph may include a health node (e.g., disease, disability, medical condition), an interest's node (e.g., hobbies, sports, music), locations node (e.g., locations or areas visited, gps tracks), contacts node (e.g., friends, persons contact information, such as address, location, when last contacted). This data or information may include weights or other ranking to identify an importance of the data.

The following are some examples of questions that may be augmented with additional keywords, tags or information based on the knowledge graph:

Initial query: "What should I eat". Relevant nodes may be the held node: which may have a medical condition of "Allergies-peanuts". The augmented reality device may augment the question to be submitted to the machine learning model as: "What should I eat. I'm allergic to peanuts and I am at [GPS or address location]."

In step 1750, the augmented reality device generates an electronic package with the generated context data and/or the augmented question or query. The augmented reality device generates a package that includes the generated question or query and the contextual data relating to the query. The generated package is then transmitted and/or used as input to a trained machine learning model.

Figure 18:
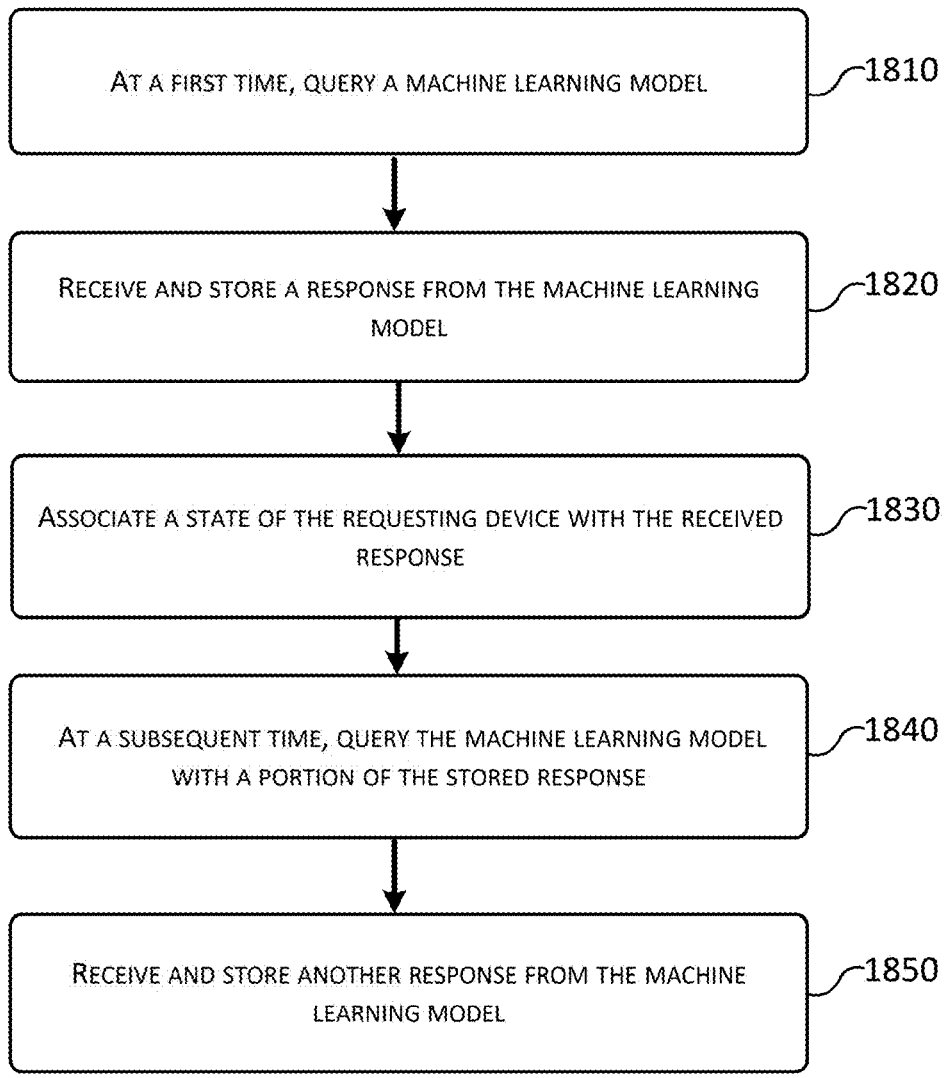
FIG. 18 illustrates a flowchart of an example method of operating an augmented reality device based on user inputs according to one embodiment of the present disclosure.

FIG. 18 illustrates a flowchart of an example method 1800 of operating an augmented reality device based on user inputs according to one embodiment of the present disclosure. In some embodiments, the augmented reality device may query or provide input to a machine learning model (such as an LLM). Typically, a machine learning model does not store a query or input to a model. In some instances, a prior context of questions asked or data input to the model is needed so that the machine learning model may provide a more precise output.

In step 1810, the augmented reality device provides a query, question or other data input to the machine learning model. For example, a user verbally asks a question "I'm hungry, where should I eat?" The augmented reality device, via a microphone, converts the verbalized question into an audio signal. The augmented reality device converts the audio signal to text via a speech-to-text process performed on the audio signal. The augmented reality device generates a question based on context of the user and the augmented reality device. The augmented reality device may search for food preferences and determine that a preferred food type is Sushi. Also, the augmented reality device may determine a current location of the augmented reality device. The current time is 5:00 p.m. Using this information, the augmented reality device generates a concatenated question using some or all of text of the verbalized question and adds additional context information about the user and the state of the device. In this example, the user is at their home. For example, the augmented reality device may generate a question such as "I'm hungry, where should I eat? I enjoy eating Sushi. I'm at location [current GPS location]. It's 5:00 p.m."

The augmented reality device transmits the generated question to the machine learning model (or any online service providing a machine learning model for data input). The augmented reality device may store the original question, the state of the device and context of the user and stores the generated question in data storage.

In step 1820, in response to providing the input, the machine learning model provides a response (i.e., an output based on the provided input). The augmented reality device receives the response and stores some or all of the response in data storage. For example, the response to the question in step 1810 from the machine learning model, may be "There are 3 Sushi restaurants near your location at address 1, address 2 address 3." Website links may also be provided. The augmented reality device displays, a map depicting a graphical indication of the location of the restaurants. Should the user go to one of the addresses, the augmented reality device may store that the user went to a particular location.

In step 1830, the augmented reality device associates a state of the device with the received response. The augmented reality device stores sensor and other state data of the device along with the received response. For example, the augmented reality device may store a record of the response along with a date time/stamp, a location of the device, and any other values of sensor data for other sensors of the augmented reality device.

In step 1840, the augmented reality device provides a subsequent query to the machine learning model. For example, assume that it is the next day. The user again asks "I'm hungry, where should I eat?" The augmented reality device would convert the verbalized question to text via a speech-to-text process. The augmented reality device again generate a question to provide to the machine learning model. In this second instance, however, the prior response may be germane to posing another question to machine learning model.

The augmented reality device may search for prior responses from a machine learning model that may be relevant to a current query being asked. The augmented reality device may perform searching (such word searching on some or all of the new query) as to a previous stored query and/or a stored response form the machine learning model. Where there is a match, the augmented reality device may evaluate and use the prior response in the new generated question. For example, the augmented reality device may generate a new question such as "I'm hungry, where should I eat? I enjoy eating Sushi. I'm at location [current GPS location]. It's 5:00 p.m." In this example, the user is at their home. This new generated question would be appropriate to ask again based on the state of the state of the augmented reality device, and the preferences of the user. However, if the same question was provided to the machine learning model, the response would likely be the same "There are 3 Sushi restaurants near your location at address 1, address 2 address 3." However, the augmented reality device may augment the new question with additional information, such as some or all of the previous response from the machine learning model and/or additional state or context of the augmented reality device or the user.

For example, the augmented reality device may generate questions such as the following:

"I'm hungry, where should I eat? I enjoy eating Sushi. I'm at location [current GPS location]. It's 5:00 p.m. Yesterday, you recommended that there are 3 Sushi restaurants near your location at address 1, address 2 address 3." In this example, the augmented reality device a portion of text from the first response to the first question provided to the machine learning model.

"I'm hungry, where should I eat? I enjoy eating Sushi. I'm at location [current GPS location]. Yesterday, I went to address 3." In this example, the augmented reality device is providing additional context form the augmented reality device based on prior location of the augmented reality device.

In step 1850, the machine learning model would provide a new response which is received and stored by the augmented reality device. Because the new question provided to the machine leaning model adds different context or information, the machine learning model may respond differently to the recommendation of where to eat. For example, the machine learning model may take into account that it already recommended 3 Sushi restaurants, and then pose a response such as:

"Would you like to try something new? I see that you may have already had Sushi."

"I see that you like Sushi, here is another Sushi restaurant at address 4."

By providing some or all of a portion of a previous response and/or additional device or user context when querying the machine learning model, the machine learning model can provide a better response with the additional information.

In some embodiments, the augmented reality device may capture a plurality of images or video via an onboard camera. The augmented reality device may package a file(s) of the images or video along with a textual question for submission to a machine learning model. For example, a user may obtain an image, via a camera, and ask a question such as: "What is this?"; "Find similar images?"; "Who is this person?"; "What type of plant is this"; etc. The augmented reality device may convert the audio signal via a speech-to-text process. The augmented reality device may transmit the images files or video and the audio signal and/or text from the speech-to-text process to the machine learning model for input.

It will be appreciated that the present disclosure may include any one and up to all of the following examples.

Example 1. A computer-implemented method of operating an augmented reality device, the computer-implemented method comprising: capturing a first plurality of camera images using a camera disposed within an augmented reality device worn by a user, wherein the augmented reality device includes an outer housing having a front and a back that are transparent and arranged to allow the user to see therethrough, an attachment component coupled to the outer housing and configured to render the augmented reality device as wearable by the user, the camera disposed within the outer housing, and a display arrangement disposed within the outer housing and configured to provide a virtual display to the user while the user is looking through the augmented reality device; processing the first plurality of camera images using a processor located within the augmented reality device; receiving a first audio signal from a microphone of the augmented reality device; processing the first audio signal using the processor located within the augmented reality device; generating a package including the processed camera images and/or the processed audio signal; transmitting the generated package to an machine learning model for input to the machine learning model; and receiving an output at least partially generated by the machine learning model.

Example 2. The method of Example 1, further comprising: displaying virtual display images automatically to the user within the augmented reality device while the user is looking through the augmented reality device and simultaneously viewing real objects through the augmented reality device, wherein the virtual display images are based on the processed camera images.

Example 3. The method of any one of Examples 1-2, further comprising: determining a context of the augmented reality device; wherein the generated package includes the determined context.

Example 4. The method of any one of Examples 1-3, wherein the context comprises any one of the following: a date and/or time of the augmented reality device, a position and/or location of the augmented reality device, data about a wearer of the device (a heart rate or pulse, a blood oxygen level, a blood pressure and/or a temperature).

Example 5. The method of any one of Examples 1-4, wherein processing the first audio signal comprises: processing the first audio signal using the processor to convert speech of the first audio signal to text.

Example 6. The method of any one of Examples 1-5, further comprising: determining a sentiment and/or tone of the first audio signal; wherein the generated package includes the determined sentiment and/or tone.

Example 7. The method of any one of Examples 1-6, further comprising: processing the received output at least partially generated by the machine learning model; and providing for display, via the optical display device the processed output.

Example 8. The method of any one of Examples 1-7, further comprising: capturing a second plurality of camera images using the camera; wherein the first plurality of camera images are obtained at a first location; and wherein the second plurality of camera images are obtained at a first location; wherein the generated package includes the first plurality of camera images and the second plurality of the camera images.

Example 9. The method of any one of Examples 1-8, determining a context of the augmented reality device comprises: determining one or more health values of a wearer of the augmented reality device; the one or more health values comprising one or more of a heart rate, blood pressure, body temperature, blood oxygen level, pupil dilation; and wherein the generated package includes the one or more health values.

Example 10. The method of any one of Examples 1-9, wherein the augmented reality device further comprises one or more of the sensors: an accelerometer; a gyroscope, position sensor, global positioning system, a temperature sensor.

Example 11. The method of any one of Examples 1-10, further comprising: generating a list of available sensor data of the augmented reality device; providing the generated list of available sensor data and a request to the machine learning model of what available sensor data of the augmented reality device would be helpful to process the generated package.

Example 12. The method of any one of Examples 1-11, further comprising: receiving a response indicating additional sensor data that would be helpful to the processing of the request by the machine learning model; and providing to the machine learning model data values of the additional sensor data.

Example 13. The method of any one of Examples 1-12, the method further comprising: generating a question to submit to the machine learning model; and preparing a historic context of the augmented reality device; wherein the generated package includes the question and the historic context.

Example 14. An augmented reality device comprising: an outer housing having a front and a back that are transparent and arranged to allow a user to see therethrough; an attachment component coupled to the outer housing and configured to render the augmented reality device as wearable by the user; a microphone; a wireless communications circuitry; a camera disposed within the outer housing; display arrangement disposed within the outer housing and configured to provide a virtual display to the user while the user is looking through the augmented reality device; and one or more processors configured to perform the operations of: capturing first plurality of camera images using the camera; processing the first plurality of camera images using the one or more processors; receiving a first audio signal from the microphone; processing the first audio signal; generating a package including the processed camera images and/or the processed audio signal; transmitting the generated package to an machine learning model for input to the machine learning model; and receiving an output at least partially generated by the machine learning model.

Example 15. The system of Example 14, the operations further comprising: displaying virtual display images automatically to the user within the augmented reality device while the user is looking through the augmented reality device and simultaneously viewing real objects through the augmented reality device, wherein the virtual display images are based on the processed camera images.

Example 16. The system of any one of Examples 14-15, the operations further comprising: determining a context of the augmented reality device; wherein the generated package includes the determined context.

Example 17. The system of any one of Examples 14-16, wherein the context comprises any one of the following: a date and/or time of the augmented reality device, a position and/or location of the augmented reality device, data about a wearer of the device (a heart rate or pulse, a blood oxygen level, a blood pressure and/or a temperature).

Example 18. The system of any one of Examples 14-17, wherein processing the first audio signal comprises: processing the first audio signal using the processor to convert speech of the first audio signal to text.

Example 19. The system of any one of Examples 14-18, the operations further comprising: determining a sentiment and/or tone of the first audio signal; wherein the generated package includes the determined sentiment and/or tone.

Example 20. The system of any one of Examples 14-19, the operations further comprising: processing the received output at least partially generated by the machine learning model; and providing for display, via the optical display device the processed output.

Example 21. The system of any one of Examples 14-20, the operations of further comprising: capturing a second plurality of camera images using the camera; wherein the first plurality of camera images are obtained at a first location; and wherein the second plurality of camera images are obtained at a first location; wherein the generated package includes the first plurality of camera images and the second plurality of the camera images.

Example 22. The system of any one of Examples 14-21, wherein determining a context of the augmented reality device comprises: determining one or more health values of a wearer of the augmented reality device; the one or more health values comprising one or more of a heart rate, blood pressure, body temperature, blood oxygen level, pupil dilation; and wherein the generated package includes the one or more health values.

Example 23. The system of any one of Examples 14-22, wherein the augmented reality device further comprises one or more of the sensors: an accelerometer; a gyroscope, position sensor, global positioning system, a temperature sensor.

Example 24. The system of any one of Examples 14-23, the operations further comprising: generating a list of available sensor data of the augmented reality device; providing the generated list of available sensor data and a request to the machine learning model of what available sensor data of the augmented reality device would be helpful to process the generated package.

Example 25. The system of any one of Examples 14-24, the operations further comprising: receiving a response indicating additional sensor data that would be helpful to the processing of the request by the machine learning model; and providing to the machine learning model data values of the additional sensor data.

Example 26. The system of any one of Examples 14-25, the operations further comprising: generating a question to submit to the machine learning model; and preparing a historic context of the augmented reality device; wherein the generated package includes the question and the historic context.

Example 27. The method of any one of Examples 1-13, the method further comprising: wherein the generated package including a first textual question for input by the machine learning model; receiving and storing the output on a storage device of the augmented reality device; generating another package including a second textual question and at least a portion of the output; transmitting the another generated package for input to the machine learning model; and receiving another output at least partially generated by the machine learning model.

Example 28. The method of any one of Examples 1-13 and 27, the method further comprising: determining a first textual question by: concatenating text generated from a first audio signal along with one or more user preferences, a state or context of the augmented reality device; and determining a second textual question by: concatenating text generated from a second audio signal along with one or more user preferences and/or a state or context of the augmented reality device.

Example 29. The method of any one of Examples 1-13 and 28, the method further comprising: determining a first textual question by: concatenating text generated from a first audio signal along with one or more user preferences, a state or context of the augmented reality device; and determining a second textual question by: concatenating text generated from a second audio signal along with at least a portion of the output received from the machine learning model.

Example 30. The system of any one of Examples 14-25, the operations further comprising: wherein the generated package including a first textual question for input by the machine learning model; receiving and storing the output on a storage device of the augmented reality device; generating another package including a second textual question and at least a portion of the output; transmitting the another generated package for input to the machine learning model; and receiving another output at least partially generated by the machine learning model.

Example 31. The system of any one of Examples 14-25 and 30, the operations further comprising: determining a first textual question by: concatenating text generated from a first audio signal along with one or more user preferences, a state or context of the augmented reality device; and determining a second textual question by: concatenating text generated from a second audio signal along with one or more user preferences and/or a state or context of the augmented reality device.

Example 32. The system of any one of Examples 14-25 and 31, the operations further comprising: determining a first textual question by: concatenating text generated from a first audio signal along with one or more user preferences, a state or context of the augmented reality device; and determining a second textual question by: concatenating text generated from a second audio signal along with at least a portion of the output received from the machine learning model.

Some portions of the preceding detailed descriptions have been presented in terms of algorithms, equations and/or symbolic representations of operations on data bits within a computer memory. These algorithmic and/or equation descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general-purpose computer selectively activated or reconfigured by a computer program stored in the computer. Such a computer program may be stored in a computer readable storage medium, such as, but not limited to, any type of disk including read-only memories (ROMs), random access memories (RAMs), EPROMs, EEPROMs, magnetic cards, or any type of media suitable for storing electronic instructions, each coupled to a computer system bus.

Various general-purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementation of the disclosure as set forth in the following claims. The disclosure and drawings are, accordingly, to be regarded in an illustrative sense rather than a restrictive sense.

Although the foregoing disclosure has been described in detail by way of illustration and example for purposes of clarity and understanding, it will be recognized that the above described disclosure may be embodied in numerous other specific variations and embodiments without departing from the spirit or essential characteristics of the disclosure. Certain changes and modifications may be practiced, and it is understood that the disclosure is not to be limited by the foregoing details, but rather is to be defined by the scope of the appended claims.

What is claimed is:

1. A computer-implemented method of operating an augmented reality device, the computer-implemented method comprising:
    capturing a first plurality of camera images using a camera disposed within an augmented reality device worn by a user, wherein the augmented reality device includes an outer housing having a front and a back that are transparent and arranged to allow the user to see therethrough, an attachment component coupled to the outer housing and configured to render the augmented reality device as wearable by the user, the camera disposed within the outer housing, and a display arrangement disposed within the outer housing and configured to provide a virtual display to the user while the user is looking through the augmented reality device;
    processing the first plurality of camera images using a processor located within the augmented reality device;
    receiving a first audio signal from a microphone of the augmented reality device;
    processing the first audio signal using the processor located within the augmented reality device;
    generating a package including the processed camera images and/or the processed audio signal;
    transmitting the generated package for input to a machine learning model; and
    receiving an output at least partially generated by the machine learning model.

2. The method of claim 1, further comprising:
    displaying virtual display images automatically to the user within the augmented reality device while the user is looking through the augmented reality device and simultaneously viewing real objects through the augmented reality device, wherein the virtual display images are based on the processed camera images.

3. The method of claim 1, further comprising:
    determining a context of the augmented reality device;
    wherein the generated package includes the determined context.

4. The method of claim 3, wherein the context comprises any one of the following: a date and/or time of the augmented reality device, a position and/or location of the augmented reality device, data about a wearer of the device (a heart rate or pulse, a blood oxygen level, a blood pressure and/or a temperature).

5. The method of claim 1, wherein processing the first audio signal comprises:
    processing the first audio signal using the processor to convert speech of the first audio signal to text.

6. The method of claim 5, further comprising:
    determining a sentiment and/or tone of the first audio signal;
    wherein the generated package includes the determined sentiment and/or tone.

7. The method of claim 1, further comprising:
    processing the received output at least partially generated by the machine learning model; and
    providing for display, via the optical display device the processed output.

8. The method of claim 1, further comprising:
    capturing a second plurality of camera images using the camera;
    wherein the first plurality of camera images are obtained at a first location; and
    wherein the second plurality of camera images are obtained at a first location;
    wherein the generated package includes the first plurality of camera images and the second plurality of the camera images.

9. The method of claim 1, determining a context of the augmented reality device comprises:
    determining one or more health values of a wearer of the augmented reality device;
    the one or more health values comprising one or more of a heart rate, blood pressure, body temperature, blood oxygen level, pupil dilation; and
    wherein the generated package includes the one or more health values.

10. The method of claim 1, wherein the augmented reality device further comprises one or more of the sensors: an accelerometer; a gyroscope, position sensor, global positioning system, a temperature sensor.

11. The method of claim 1, further comprising:
    generating a list of available sensor data of the augmented reality device; and
    providing the generated list of available sensor data and a request to the machine learning model of what available sensor data of the augmented reality device would be helpful to process the generated package.

12. The method of claim 11, further comprising:
    receiving a response indicating additional sensor data that would be helpful to the processing of the request by the machine learning model; and
    providing to the machine learning model data values of the additional sensor data.

13. The method of claim 1, the method further comprising:
    generating a question to submit to the machine learning model; and preparing a historic context of the augmented reality device;
wherein the generated package includes the question and the historic context.

14. The method of claim 1, the method further comprising:
wherein the generated package including a first textual question for input by the machine learning model;
receiving and storing the output on a storage device of the augmented reality device;
generating another package including a second textual question and at least a portion of the output;
transmitting the another generated package for input to the machine learning model; and
receiving another output at least partially generated by the machine learning model.

15. The method of claim 1, the method further comprising:
determining a first textual question by:
concatenating text generated from a first audio signal along with one or more user preferences, a state or context of the augmented reality device; and
determining a second textual question by:
concatenating text generated from a second audio signal along with at least a portion of the output received from the machine learning model.

16. An augmented reality device comprising:
an outer housing having a front and a back that are transparent and arranged to allow a user to see therethrough;
an attachment component coupled to the outer housing and configured to render the augmented reality device as wearable by the user;
a microphone;
a wireless communications circuitry;
a camera disposed within the outer housing;
display arrangement disposed within the outer housing and configured to provide a virtual display to the user while the user is looking through the augmented reality device; and
one or more processors configured to perform the operations of:
capturing first plurality of camera images using the camera;
processing the first plurality of camera images using the one or more processors;
receiving a first audio signal from the microphone;
processing the first audio signal;
generating a package including the processed camera images and/or the processed audio signal;
transmitting the generated package to a machine learning model for input to the machine learning model; and
receiving an output at least partially generated by the machine learning model.

17. The system of claim 16, the operations further comprising:
displaying virtual display images automatically to the user within the augmented reality device while the user is looking through the augmented reality device and simultaneously viewing real objects through the augmented reality device, wherein the virtual display images are based on the processed camera images.

18. The system of claim 16, the operations further comprising:
determining a context of the augmented reality device;
wherein the generated package includes the determined context.

19. The system of claim 18, wherein the context comprises any one of the following: a date and/or time of the augmented reality device, a position and/or location of the augmented reality device, data about a wearer of the device (a heart rate or pulse, a blood oxygen level, a blood pressure and/or a temperature).

20. The system of claim 16, wherein processing the first audio signal comprises:
processing the first audio signal using the processor to convert speech of the first audio signal to text.

21. The system of claim 20, the operations further comprising:
determining a sentiment and/or tone of the first audio signal;
wherein the generated package includes the determined sentiment and/or tone.

22. The system of claim 16, the operations further comprising:
processing the received output at least partially generated by the machine learning model; and
providing for display, via the optical display device the processed output.

23. The system of claim 16, the operations of further comprising:
capturing a second plurality of camera images using the camera;
wherein the first plurality of camera images are obtained at a first location; and
wherein the second plurality of camera images are obtained at a first location;
wherein the generated package includes the first plurality of camera images and the second plurality of the camera images.

24. The system of claim 16, wherein determining a context of the augmented reality device comprises:
determining one or more health values of a wearer of the augmented reality device;
the one or more health values comprising one or more of a heart rate, blood pressure, body temperature, blood oxygen level, pupil dilation; and
wherein the generated package includes the one or more health values.

25. The system of claim 16, wherein the augmented reality device further comprises one or more of the sensors: an accelerometer; a gyroscope, position sensor, global positioning system, a temperature sensor.

26. The system of claim 16, the operations further comprising:
generating a list of available sensor data of the augmented reality device;
providing the generated list of available sensor data and a request to the machine learning model of what available sensor data of the augmented reality device would be helpful to process the generated package.

27. The system of claim 16, the operations further comprising:
receiving a response indicating additional sensor data that would be helpful to the processing of the request by the machine learning model; and
providing to the machine learning model data values of the additional sensor data.

28. The system of claim 16, the operations further comprising:
generating a question to submit to the machine learning model; and preparing a historic context of the augmented reality device;

wherein the generated package includes the question and the historic context.

29. The system of claim 16, the operations further comprising:

wherein the generated package including a first textual question for input by the machine learning model;

receiving and storing the output on a storage device of the augmented reality device;

generating another package including a second textual question and at least a portion of the output;

transmitting the another generated package for input to the machine learning model; and receiving another output at least partially generated by the machine learning model.

30. The system of claim 16, the operations further comprising:

determining a first textual question by:
concatenating text generated from a first audio signal along with one or more user preferences, a state or context of the augmented reality device; and
determining a second textual question by:
concatenating text generated from a second audio signal along with at least a portion of the output received from the machine learning model.

* * * * *